United States Patent
Shen

(10) Patent No.: US 10,501,136 B2
(45) Date of Patent: Dec. 10, 2019

(54) LOCK ASSEMBLY

(71) Applicant: I-TEK METAL MFG. CO., LTD, Tainan (TW)

(72) Inventor: Chun-Meng Shen, Tainan (TW)

(73) Assignee: I-TEK METAL MFG. CO., LTD, Tainan (TW)

( * ) Notice: Subject to any disclaimer, the term of this patent is extended or adjusted under 35 U.S.C. 154(b) by 24 days.

(21) Appl. No.: 15/987,052

(22) Filed: May 23, 2018

(65) Prior Publication Data

US 2019/0300082 A1    Oct. 3, 2019

(30) Foreign Application Priority Data

Mar. 28, 2018    (TW) .................................. 107110752

(51) Int. Cl.
| | | |
|---|---|---|
| *B62H 5/00* | (2006.01) | |
| *B62H 5/02* | (2006.01) | |
| *E05B 71/00* | (2006.01) | |

(52) U.S. Cl.
CPC .............. *B62H 5/003* (2013.01); *B62H 5/001* (2013.01); *B62H 5/02* (2013.01); *E05B 71/00* (2013.01)

(58) Field of Classification Search
CPC .......... B62H 5/003; B62H 5/001; B62H 5/02; B62H 5/06; B60R 25/02153; E05B 71/00
USPC .......... 70/30, 49, 182–186, 233, 252, 278.7, 70/279.1, 280–282
See application file for complete search history.

(56) References Cited

U.S. PATENT DOCUMENTS

| | | | | |
|---|---|---|---|---|
| 1,714,426 | A * | 5/1929 | Kuepfer .................. | B60R 25/04 70/252 |
| 1,991,825 | A * | 2/1935 | Strickland .............. | B62H 5/003 70/233 |
| 4,055,060 | A * | 10/1977 | Bellino .................... | B62H 5/06 70/234 |
| 2009/0165510 | A1* | 7/2009 | Sugimoto ......... | B60R 25/02153 70/253 |
| 2010/0000274 | A1* | 1/2010 | Viso Cabrera .......... | E05B 17/22 70/278.7 |

* cited by examiner

*Primary Examiner* — Lloyd A Gall
(74) *Attorney, Agent, or Firm* — Alan D. Kamrath; Karin L. Williams; Mayer & Williams PC

(57) ABSTRACT

A lock assembly includes a driving member pivotably mounted in a frame and interlocks with a tappet. The driving member and a follower member pivot jointly when a follower pin is in a first position. The follower member is independently pivotable when the follower pin is in a second position. When the tappet is moved by a lock head from a front position to a rear position, an engaging member is moved to an engagement position engaged with the lock head to thereby lock the lock head, and the follower pin is in the first position. When the follower pin is moved to the second position, a return spring biases the follower member to independently pivot relative to the driving member to move the engaging member to a disengagement position, the tappet moves from the rear position to the front position, and the lock head is unlocked.

12 Claims, 17 Drawing Sheets

LOCK ASSEMBLY

BACKGROUND OF THE INVENTION

The present invention relates to a lock assembly and, more particularly, to a lock assembly for locking a latch.

Locks are generally used to provide an anti-theft effect. A type of lock includes a latch having an engaging groove for coupling with an engaging member to retain the latch in place, thereby achieving a locking function. The engaging member is generally biased by a spring to a protruding position. When the latch extends into a lock body, the engaging member is retracted by the latch until the engaging groove of the latch is aligned with the engaging member. The engaging member moves into the engaging groove under the bias of the spring to retain the latch in place. However, the engaging member retained in the protruding position by the spring could be moved by hammering with an external force, leading to undesired release of the latch.

Furthermore, a lock can only provide locking of a single object, which is not useful enough for providing a sufficient anti-theft effect for a vehicle, such as a bicycle.

BRIEF SUMMARY OF THE INVENTION

To avoid the disadvantages encountered in the conventional locks, the present invention provides a lock assembly including a lock device. The lock device includes a frame having an installation space. A tappet mechanism is mounted in the installation space of the frame. The tappet mechanism includes a tappet movable between a front position and a rear position. The tappet is biased to the front position. A driving member is pivotably mounted in the installation space of the frame and interlocks with the tappet. The driving member includes a first guiding groove. The driving member is actuated to pivot when the tappet moves between the front position and the rear position. A follower member is pivotably mounted in the installation space of the frame and includes a guiding slot. The guiding slot includes a movement portion and a positioning portion intersecting with the movement portion. A return spring is mounted between the driving member and the follower member. The return spring biases the follower member. An unlocking member is pivotably mounted in the installation space of the frame and includes a movement groove. The movement groove includes a pressing side. The unlocking member is movable between a pressing position and a non-pressing position. A follower pin is movably received in the first guiding groove, the guiding slot, and movement groove. The follower pin is movable to a first position in the positioning portion or a second position in the movement portion. The follower pin is in the first position when the unlocking member is in the non-pressing position. The follower pin is in the second position when the unlocking member is in the pressing position. The driving member and the follower member pivot jointly when the follower pin is in the first position. The follower member is independently pivotable relative to the driving member when the follower pin is in the second position. A locking unit is received in the installation space of the frame and interlocks with the follower member. The locking unit includes an engaging member that moves between an engagement position and a disengagement position when the follower member pivots. The engaging member is in the disengagement position when the tappet is in the front position. The engaging member is in the engagement position when the tappet is in the rear position. A first driver is mounted in the installation space of the frame. The first driver interlocks with and is jointly moveable with the unlocking member between the pressing position and the non-pressing position. A lock head selectively extends into the tappet mechanism. The lock head includes an engaging groove.

When the lock head is outside of the tappet mechanism, the tappet is in the front position, and the follower pin is in the first position. When the lock head extends into the tappet mechanism and moves the tappet to the rear position, the engaging groove of the lock head engages with the engaging member of the locking unit, the follower pin is in the first position, and the lock head is in a locked state. When the follower pin is moved to the second position while the lock head is in the locked state, the return spring biases the follower member to independently pivot relative to the driving member to move the engaging member from the engagement position to the disengagement position, the tappet moves from the rear position to the front position, permitting the lock head to disengage from the tappet mechanism.

In an example, the locking unit further includes a first unit pivotably mounted in the installation space of the frame and interlocked with the follower member. Pivotal movement of the follower member causes pivotal movement of the first unit. The locking unit further includes a second unit pivotably mounted in the installation space of the frame and interlocked with the first unit. The second unit includes a lower portion and a higher portion. The engaging member abuts against the second unit. Pivotal movement of the first unit causes pivotal movement of the second unit to a first position in which the lower portion is aligned with the engaging member or a second position in which the higher portion is aligned with the engaging member. When the tappet is in the front position, the lower portion of the second unit is aligned with the engaging member, and the engaging member is in the disengagement position. When the tappet is in the rear position, the higher portion of the second unit is aligned with the engaging member, and the engaging member is in the engagement position.

In an example, locking unit further includes a biasing spring mounted between the first unit and the second unit. The second unit further includes a limiting recess and a protrusion. The lower portion is located between the limiting recess and the higher portion in a circumferential direction about a pivoting axis of the second unit. The first unit further includes a limiting rod received in the limiting recess. The biasing spring abuts against the limiting rod of the first unit and the protrusion of the second unit and biases the second unit. When the tappet is in the front position, the limiting rod abuts against an end of the limiting recess. When the tappet moves from the front position to the rear position, the follower member actuates the first unit to independently pivot relative to the second unit until the limiting rod moves to and presses against another end of the limiting recess, and the first unit and the second unit jointly pivot until the lock head is in the locked state.

In an example, the tappet includes a toothed portion on an outer periphery thereof, wherein the driving member includes a first toothed portion meshed with the toothed portion of the tappet, wherein the follower member includes a second toothed portion on an outer periphery thereof, and wherein the first unit includes a driven toothed portion meshed with the second toothed portion of the follower member.

In an example, the tappet mechanism includes a jacket fixed in the installation space of the frame. The jacket includes an insertion groove and a through-hole intercommunicated with the insertion groove. The jacket further includes an opening intercommunicated with the insertion groove and spaced from the through-hole. The tappet movable between the front position and the rear position is received in the insertion groove. A portion of the tappet is exposed via the opening. The engaging member movable between the engagement position and the disengagement position is received in the through-hole. The driving member is coupled with the tappet via the opening. A tappet spring is received between the insertion groove of the jacket and the tappet. The tappet spring biases the tappet toward the front position.

In an example, the unlocking member further includes a push portion located outside of the movement groove. The first driver further includes a cam located adjacent to the push portion. The first driver drives the cam to rotate. The cam is configured to press against the push portion of the unlocking member to pivot the unlocking member to one of the pressing position and the non-pressing position.

In an example, the lock assembly further includes a casing having an upper end, a lower end, and a compartment extending from the upper end through the lower end. The casing further includes an inner face having a coupling groove intercommunicated with the compartment and a through-hole extending from an outer periphery of the casing to the compartment. The lock device is received in the compartment. The tappet is aligned with the through-hole. The frame of the lock device further includes a plurality of upper engaging portions formed on an upper end of an outer side thereof and a plurality of lower engaging portions formed on a lower end of the outer side thereof. An upper lid includes an engaging block corresponding to the coupling groove and a latch hole. The upper lid is mounted to the upper end of the casing. The engaging block engages with the coupling groove. The upper lid and the plurality of upper engaging portions are screwed by a plurality of upper screws. A lower lid is mounted to the lower end of the casing. The lower lid and the plurality of lower engaging portions of the frame are screwed by a plurality of lower screws. The lock device further includes a safety device mounted in the installation space of the frame and located adjacent to the upper lid. The safety device includes a second driver and a latch configured to be actuated by the second driver to move between a coupling position and a non-coupling position. When the latch is in the coupling position, the latch engages with the latch hole of the upper lid, avoiding the upper lid from separating from the casing when the plurality of upper screws is removed. When the latch is in the non-coupling position, the latch disengages from the latch hole of the upper lid, permitting the upper lid to separate from the casing when the plurality of upper screws is removed.

In another example, the lock assembly further includes a casing having a compartment and a shaft tube located outside of the compartment. The shaft tube includes an axial hole. The casing further includes a through-hole intercommunicating the compartment with the axial hole. The lock device is mounted in the compartment of the casing. An object includes a locking hole and is movably received in the axial hole of the shaft tube. The follower member further includes a receiving groove. A push member is movably received in the receiving groove. The push member has an end protruding outside of the follower member and pivotable together with the follower member. A linking rod is pivotably received in the installation space of the frame and abutting an outer end of the follower member. The linking rod includes a pressing end. When the follower member pivots, the outer end of the follower member pivots the linking rod. A pin module is mounted in the installation space of the frame. The pin module includes a locking rod movable between an extended position and a retracted position. The locking rod is biased to the retracted position. When the tappet is in the front position, the locking rod is in the retracted position, the locking rod is disengaged from the locking hole of the object, and the object is not locked. When the tappet is moved from the front position to the rear position, the linking rod pushes the locking rod from the retracted position to the extended position to engage with the locking hole of the object, and the object is locked.

In an example, the lock assembly further includes an object having a locking hole. The casing includes a compartment and a shaft tube located outside of the compartment. The shaft tube includes an axial hole. The casing further includes a through-hole intercommunicating the compartment with the axial hole. The object is movably received in the axial hole of the shaft tube. The follower member includes a receiving groove. A push member is movably received in the receiving groove. The push member has an end protruding outside of the follower member and is pivotable together with the follower member. A linking rod is pivotably received in the installation space of the frame and abutting an outer end of the follower member. The linking rod includes a pressing end. When the follower member pivots, the outer end of the follower member pivots the linking rod. A pin module is mounted in the installation space of the frame. The pin module includes a locking rod movable between an extended position and a retracted position, wherein the locking rod is biased to the retracted position. When the tappet is in the front position, the locking rod is in the retracted position, the locking rod is disengaged from the locking hole of the object, and the object is not locked. When the tappet is moved from the front position to the rear position, the linking rod pushes the locking rod from the retracted position to the extended position to engage with the locking hole of the object, and the object is locked.

In an example, the lock head includes an end remote to the engaging groove, and the end of the lock head is mounted on the casing.

In an example, the lock assembly further includes a detection module having a base mounted in the installation space of the frame and located below the unlocking member. The first driver is coupled to the base. The detection module includes a first sensor mounted on the base and aligned with the locking unit. When the tappet is in the front position, the locking unit releases the first sensor. When the tappet is in the rear position, the locking unit presses against the first sensor.

In another example, the lock assembly further includes a detection module having a base mounted in the installation space of the frame and located below the unlocking member. The first driver is coupled to the base. The detection module includes a first sensor mounted on the base and aligned with the locking unit. The detection module further includes a second sensor aligned with the linking rod. When the tappet is in the front position, the locking unit releases the first sensor. When the tappet is in the rear position, the locking unit presses against the first sensor. When the locking rod is in the retracted position, the linking rod releases the second sensor. When the locking rod is in the extended position, the linking rod presses against the second sensor.

The present invention will become clearer in light of the following detailed description of illustrative embodiments of this invention described in connection with the drawings.

DESCRIPTION OF THE DRAWINGS

The illustrative embodiments may best be described by reference to the accompanying drawings where.

Figure 1:
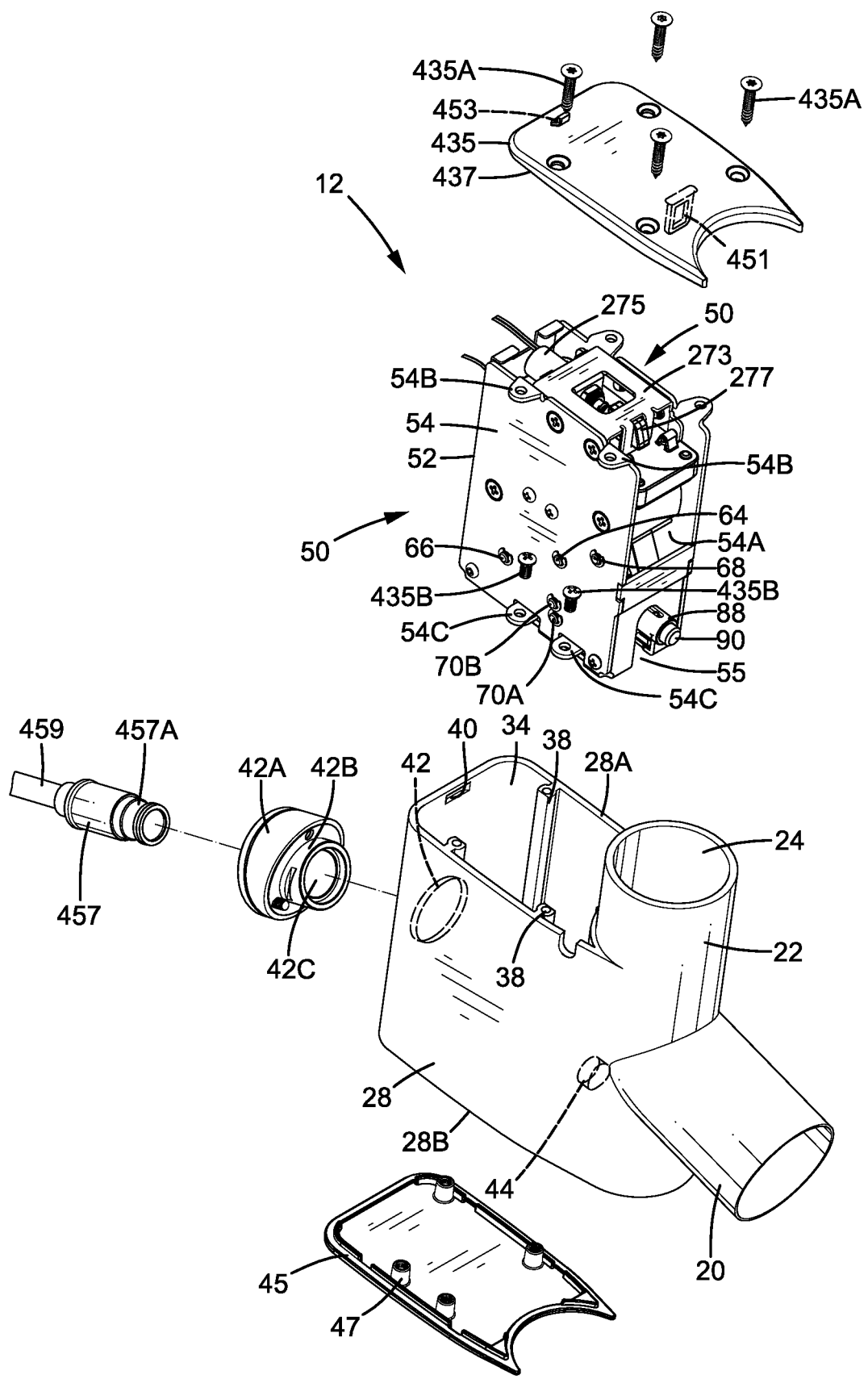
FIG. 1 is an exploded, perspective view of a lock assembly according to the present invention.

All figures are drawn for ease of explanation of the basic teachings only; the extensions of the figures with respect to number, position, relationship, and dimensions of the parts to form the illustrative embodiments will be explained or will be within the skill of the art after the following teachings have been read and understood. Further, the exact dimensions and dimensional proportions to conform to specific force, weight, strength, and similar requirements will likewise be within the skill of the art after the following teachings have been read and understood.

Where used in the various figures of the drawings, the same numerals designate the same or similar parts. Furthermore, when the terms "first", "second", "third", "inner", "outer", "front", "rear", "lower", "upper", "face", "side", and similar terms are used herein, it should be understood that these terms have reference only to the structure shown in the drawings as it would appear to a person viewing the drawings and are utilized only to facilitate describing the illustrative embodiments.

DETAILED DESCRIPTION OF THE INVENTION

With reference to the drawings, a lock assembly 12 of an embodiment according to the present invention includes a casing 28 and a lock device 50 (FIG. 1) mounted in the casing 28. The lock device 50 includes a frame 52 having two sidewalls 54 extending parallel to and spaced from each other, defining an installation space MA between the two sidewalls 54. Each of the two sidewalls 54 includes a first hole 56, a second hole 58, and a third hole 60. Each of the two sidewalls 54 further includes a pivotal hole 62A and a fixing hole 62B. Each of the two sidewalls 54 further includes a plurality of upper engaging portions 54B at an upper end thereof and a plurality of lower engaging portions MC at a lower end thereof.

A first axle 64 extends through the first holes 56 of the two sidewalls 54 of the frame 52. A second axle 66 extends through the second holes 58 of the two sidewalls 54 of the frame 52. A third axle 68 extends through the third holes 60 of the two sidewalls 54 of the frame 52. A pivot 70A extends through the pivotal holes 62A of the two sidewalls 54 of the frame 52. A limiting axle 70B extends through the fixing holes 62B of the two sidewalls 54 of the frame 52.

Lock device 50 includes a tappet mechanism 234 mounted in the installation space 54A. The tappet mechanism 234 includes a jacket 238 fixed between the two sidewalls 54 of the frame 52. The jacket 238 includes a first end, a second end spaced from the first end along an axis, and an insertion groove 239 extending from the first end through the second end along the axis. The jacket 238 further includes a through-hole 252 and an opening 254 spaced from the through-hole 252 along the axis, with each of the through-hole 252 and the opening 254 extending from an outer periphery thereof to the insertion groove 239 in a radial direction perpendicular to the axis.

Figure 10:
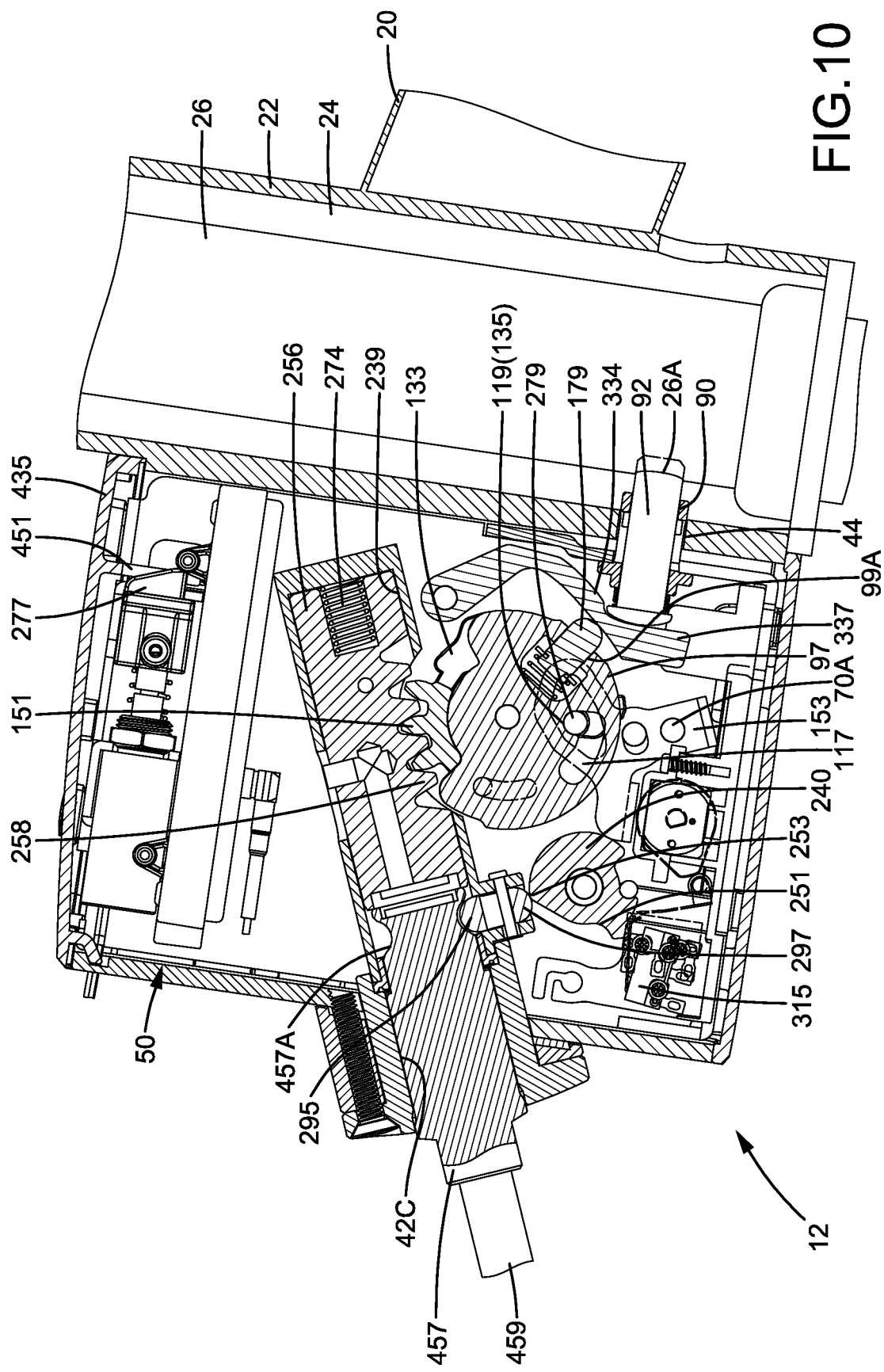
FIG. 10 is a view similar to FIG. 7, with the lock head moved into the lock device and with the tappet moved to the rear position.

The tappet mechanism 234 further includes a tappet 256 movably received in the insertion groove 239 of the jacket 238. The tappet 256 includes a toothed portion 258 formed on an outer periphery thereof and having a plurality of teeth. The toothed portion 258 of the tappet 256 is exposed via the opening 254 of the jacket 238. The tappet 256 is movable along the insertion groove 239 of the jacket 238 between a front position (FIG. 7) and a rear position (FIG. 10). Furthermore, a tappet spring 274 is mounted between the tappet 256 and the jacket 238 and biases the tappet 256 to the front position.

The tappet mechanism 234 further includes a ring 299 fixed to an end of the insertion groove 239 of the jacket 238. The ring 299 can be made of an elastomeric material, such as rubber, silicon rubber, etc. The ring 299 includes a coupling hole 310 having an inner diameter smaller than an outer diameter of the tappet 256. When the tappet 256 is in the front position, a front end of the tappet 256 abuts against an end face of the ring 299 (FIG. 7), providing a sealing effect. Thus, water or impurities outside of the lock assembly 12 cannot enter the interior of the lock assembly 12 via the insertion groove 239.

The lock device 50 further includes a control unit 95 mounted in the installation space 54A of the frame 52. The control unit 95 includes a driving member 133 and a follower member 97. The driving member 133 and the follower member 97 pivotable about the same pivoting axis. The driving member 133 includes a recessed portion 137 in an outer periphery thereof. A first guiding groove 135 is defined in a first side of the driving member 133, is located radially inward of the outer periphery, and is spaced from the recessed portion 137. A second guiding groove 139 is defined in a lateral wall of the recessed portion 137. A first toothed portion 151 is formed on the outer periphery of the driving member 133 and includes a plurality of teeth protruding beyond the outer periphery of the driving member 133. A driving rod 152 is disposed on a second side of the driving member 133 opposite to the first side of the driving member 133 and is offset from a pivoting axis of the driving member 133. The driving member 133 is pivotably around the first axle 64 about a pivotal axis defined by the first axle 64. The first toothed portion 151 of the driving member 133 meshes with the toothed portion 258 of the tappet 256. Thus, the driving member 133 pivots when the tappet 256 moves between the front position (FIG. 7) and the rear position (FIG. 10).

The follower member 97 includes a first side, a second side opposite to the first side, and an outer periphery extending between the first side and the second side. The follower member 97 includes a receiving groove 99 and a radial hole 99A extending from the outer periphery of the follower member 97 to the receiving groove 99 in a radial direction perpendicular to a pivoting axis of the follower member 97. The follower member 97 further includes a guiding slot 115 extending from the first side through the second side of the follower member 97. The guiding slot 115 includes a movement portion 117 extending in a circumferential direction about the pivoting axis of the follower member 97 and a positioning portion 119 extending from and at a non-parallel angle to an end of the movement portion 117. In this embodiment, the positioning portion 119 extends perpendicular to the movement position 117. A pull rod 111 is disposed on the first side of the follower member 97 and is spaced from the pivoting axis of the follower member 97. A guiding rod 113 is disposed on the second side of the follower member 97 and is spaced from the pivoting axis of the follower member 97. The receiving groove 99 is located between the pull rod 111 and the guiding slot 115 in the circumferential direction of the pivoting axis of the follower member 97. A second toothed portion 131 is disposed on the outer periphery of the follower member 97 and includes a plurality of teeth.

The follower member 97 is pivotably mounted about the first axle 64. Thus, both the follower member 97 and the driving member 133 pivot about the pivoting axis defined by the first axle 64. The second side of the follower member 97 abuts the first side of the driving member 133. The guiding rod 113 is received in the second guiding groove 139. The guiding slot 115 is aligned with the first guiding groove 135. A return spring 231 is located between the follower member 97 and the driving member 133 and is received in the recessed portion 137. An end of the return spring 231 abuts against the guiding rod 113, and the other end of the return spring 231 abuts against the an inner surface of the recessed portion 137. The follower member 97 is pivotable relative to the driving member 133 in the second guiding groove 139.

The control unit 95 further includes a pressing spring 191 received in the receiving groove 99. Furthermore, a push member 179 is received in the radial hole 99A and has an inner end received in the receiving groove 99 and an outer end located outside of the outer periphery of the follower member 97 under the bias of the pressing spring 191.

Figure 7:
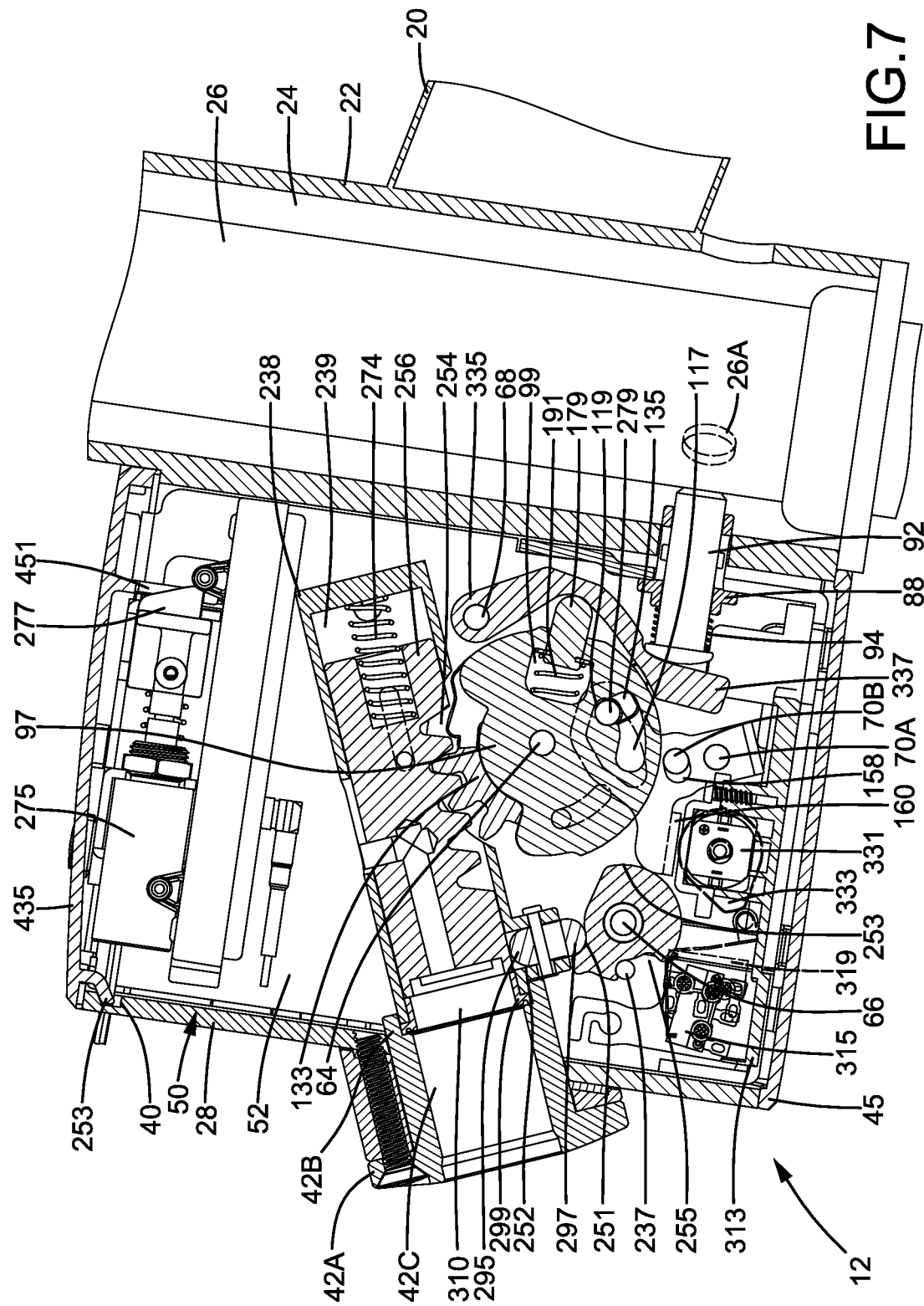
FIG. 7 is a cross sectional view taken along section line 7-7 of FIG. 4.

The control unit 95 further includes a follower pin 279 received in the guiding slot 115 and the first guiding groove 135. A first end of the follower pin 279 is located outside of the follower member 97. A second end of the follower pin 279 is located outside of the driving member 133. The follower pin 279 is movable between a first position and a second position. When the follower pin 279 is in the first position, the follower pin 279 is received in the positioning portion 119 of the guiding slot 115 (FIG. 7), and the driving member 133 and the follower member 97 can only pivot jointly with each other. When the follower pin 279 is in the second position, the follower pin 279 is received in the movement portion 117 of the guiding slot 115 (FIG. 11), and the follower member 97 is pivotable in the second guiding slot 139 relative to the driving member 133. A first tension spring 291A is mounted between the pull rod 111 of the follower member 97 and the first end of the follower pin 279. A second tension spring 291B is mounted between the driving rod 152 of the driving member 133 and the second end of the follower pin 279. The first and second tension springs 291A and 291B bias the follower pin 279 to the first position (FIG. 7).

The lock device 50 further includes an unlocking member 153 pivotably received in the installation space 54A of the frame 52. The unlocking member 153 is substantially U-shaped having two sidewalls. Each of the two sidewalls includes a pivotal hole 157 and a movement groove 159. Each of the two sidewalls of the unlocking member 153 further includes a limiting groove 158 that is arcuate and that is located between the pivotal hole 157 and the movement groove 159. The movement groove 159 of each of the two sidewalls includes a pressing side 159A. Each of the two sidewalls 159 further includes a push portion 160 that protrudes from a portion adjacent to the movement groove 159. The pivot 70A is received in the pivotal holes 157 of the unlocking member 153. The limiting axle 70B is received in the limiting groove 158. Thus, the unlocking member 153 is pivotable in the limiting groove 158 about a pivoting axis defined by the pivot 70A. Furthermore, the first end and the second end of the follower pin 279 are respectively received in the movement grooves 159 of the unlocking member 153.

The lock device 50 further includes a locking unit 232 pivotably mounted in the installation space 54A of the frame 52. The locking unit 232 includes a first unit 233 pivotably mounted about the second axle 66. The first unit 233 includes a limiting rod 237 formed on a first side thereof and a driven toothed portion 235 formed on an outer periphery thereof and having a plurality of teeth. The locking unit 232 further includes a second unit 240 pivotably mounted around the second axle 66. In this embodiment, the second unit 240 is in the form of a cam and includes a limiting recess 255 that is in the form of an arcuate groove defined in an outer periphery of the cam. The outer periphery of the second unit 240 in the form of a cam further includes a lower portion 251 and a higher portion 253. The lower portion 251 is located between the limiting recess 255 and the higher portion 253 in a circumferential direction about the second axle 66. Furthermore, the second unit 240 includes a protrusion 259 formed on a side thereof and located adjacent to the higher portion 253.

The first side of the first unit 233 abuts an end face of the protrusion 259 of the second unit 240. The limiting rod 237 of the first unit 233 is received in the limiting recess 255 of the second unit 240. Thus, the first unit 233 is pivotable in the limiting groove 255 relative to the second unit 240.

Figure 6:
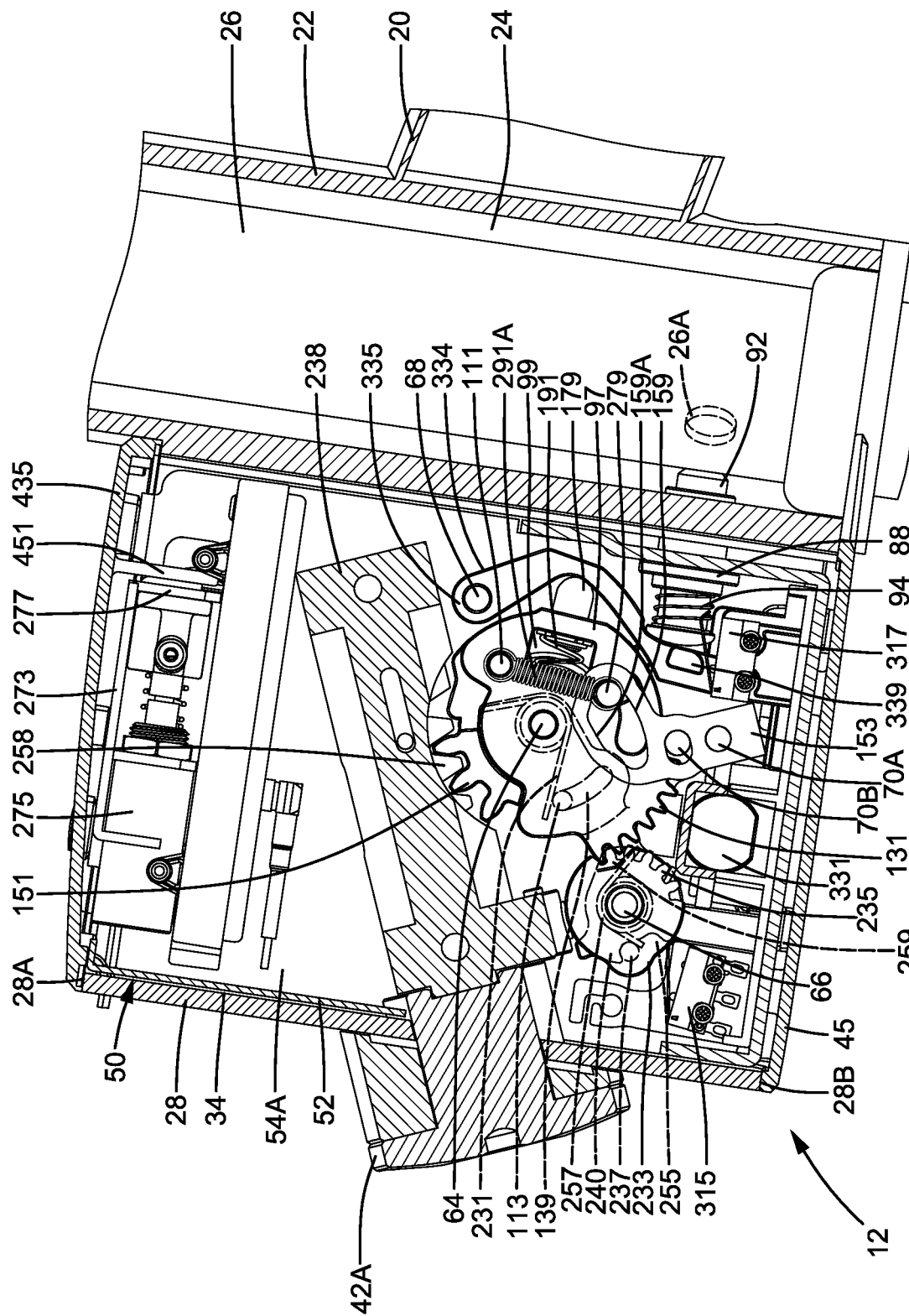
FIG. 6 is a cross sectional view taken along section line 6-6 of FIG. 4.

The locking unit 232 further includes a biasing spring 257 mounted between the first unit 233 and the second unit 240. The locking unit 232 further includes an engaging member 293 movably received in the jacket 238. An end of the biasing spring 257 abuts against the limiting rod 237. The other end of the biasing spring 257 abuts against the protrusion 259 of the second unit 240 (FIG. 6). The driven toothed portion 235 of the first unit 233 of the locking unit 232 meshes with the second toothed portion 131 of the follower member 97 of the control unit 95. Thus, when the follower member 97 pivots, the first unit 233 is driven to pivot. Furthermore, the first unit 233 is pivotable relative to the second unit 240 due to provision of the limiting recess 255.

Figure 11:
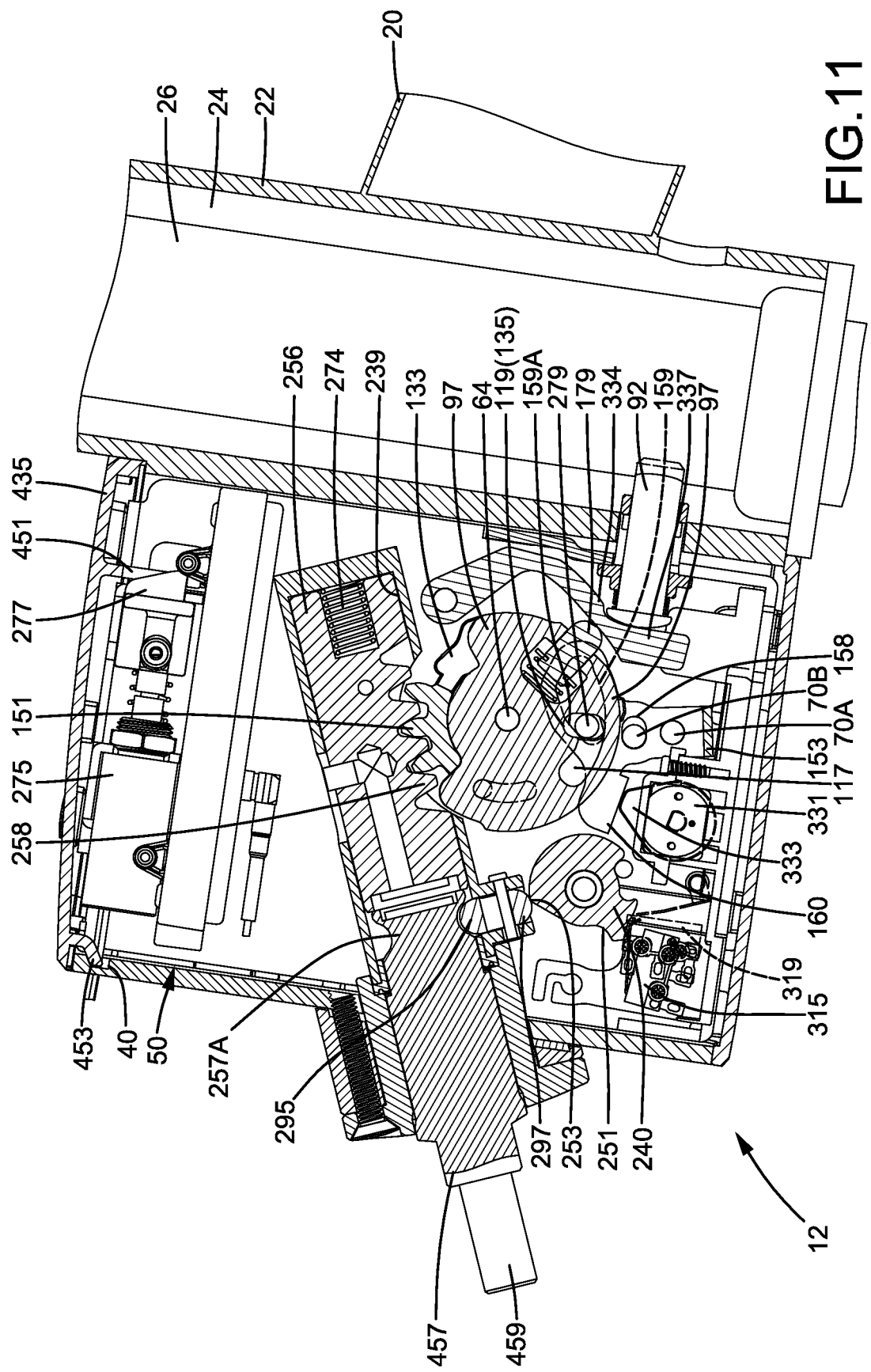
FIG. 11 is a view similar to FIG. 10, with an unlocking member pivoted to a pressing position and with a follower pin moved to a second position.

The engaging member 293 is movably received in the through-hole 252 of the jacket 238. The engaging member 293 includes an engaging end 295 and an abutting end 297. The abutting end 297 of the engaging member 293 abuts the outer periphery of the second unit 240, and the engaging end 295 faces the insertion groove 239 of the jacket 238. When the second unit 240 pivots, the engaging member 293 is pushed to a disengagement position in which the engaging end 295 is outside of the insertion groove 239 or an engagement position in which the engaging end 295 is received in the insertion groove 239. Furthermore, when the second unit 240 pivots to a position in which the lower portion 251 is aligned with the abutting end 297 of the engaging member 293, the engaging member 293 is in the disengagement position (FIG. 7). On the other end, when the second unit 240 pivots to another position in which the higher portion 253 is aligned with the engaging member 293, the engaging member 293 is in the engagement position (FIG. 11).

Figure 2:
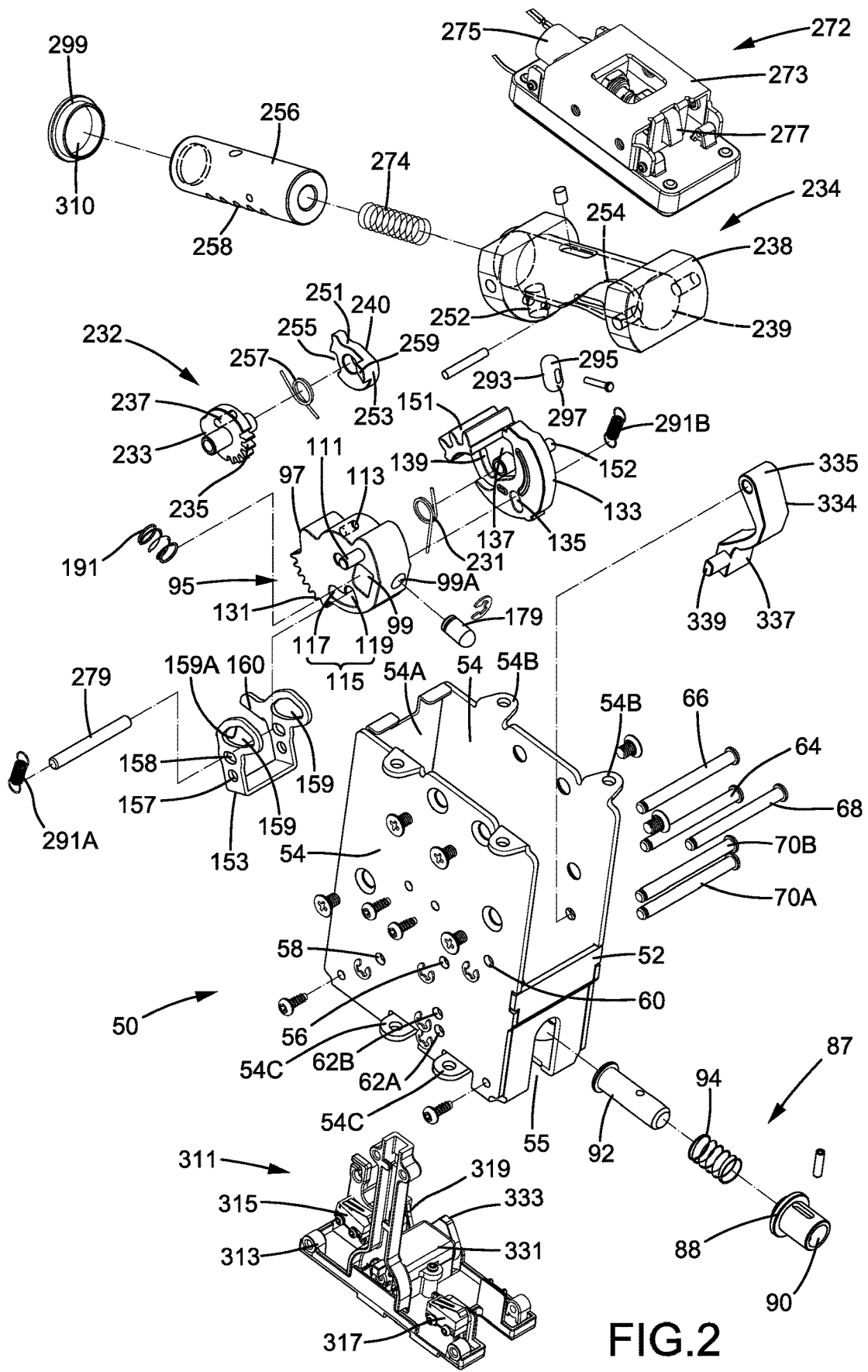
FIG. 2 is an exploded, perspective view of a lock device of the lock assembly of FIG. 1.
Figure 3:
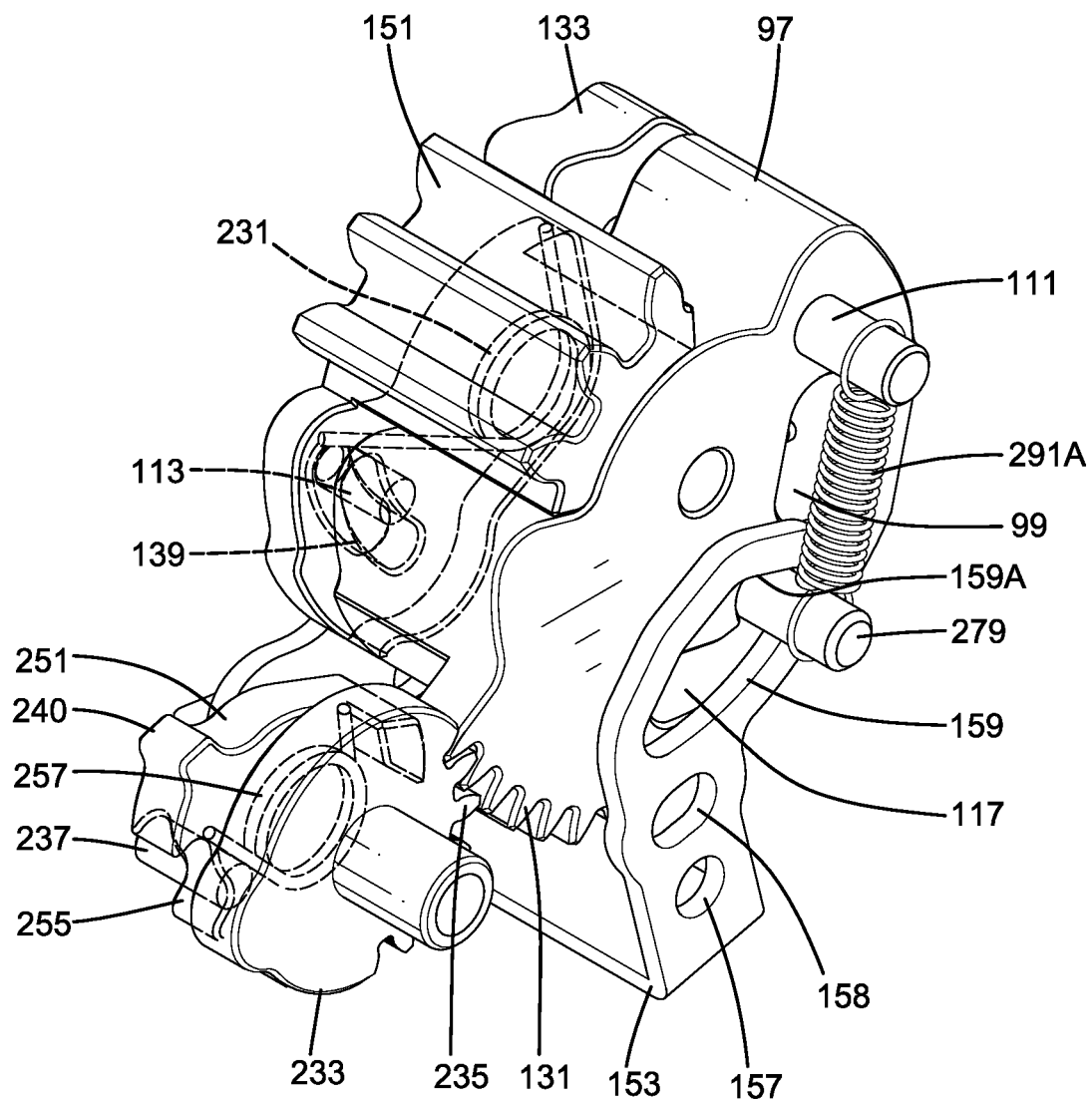
FIG. 3 is a perspective view of a control unit of the lock assembly of FIG. 1.
Figure 4:
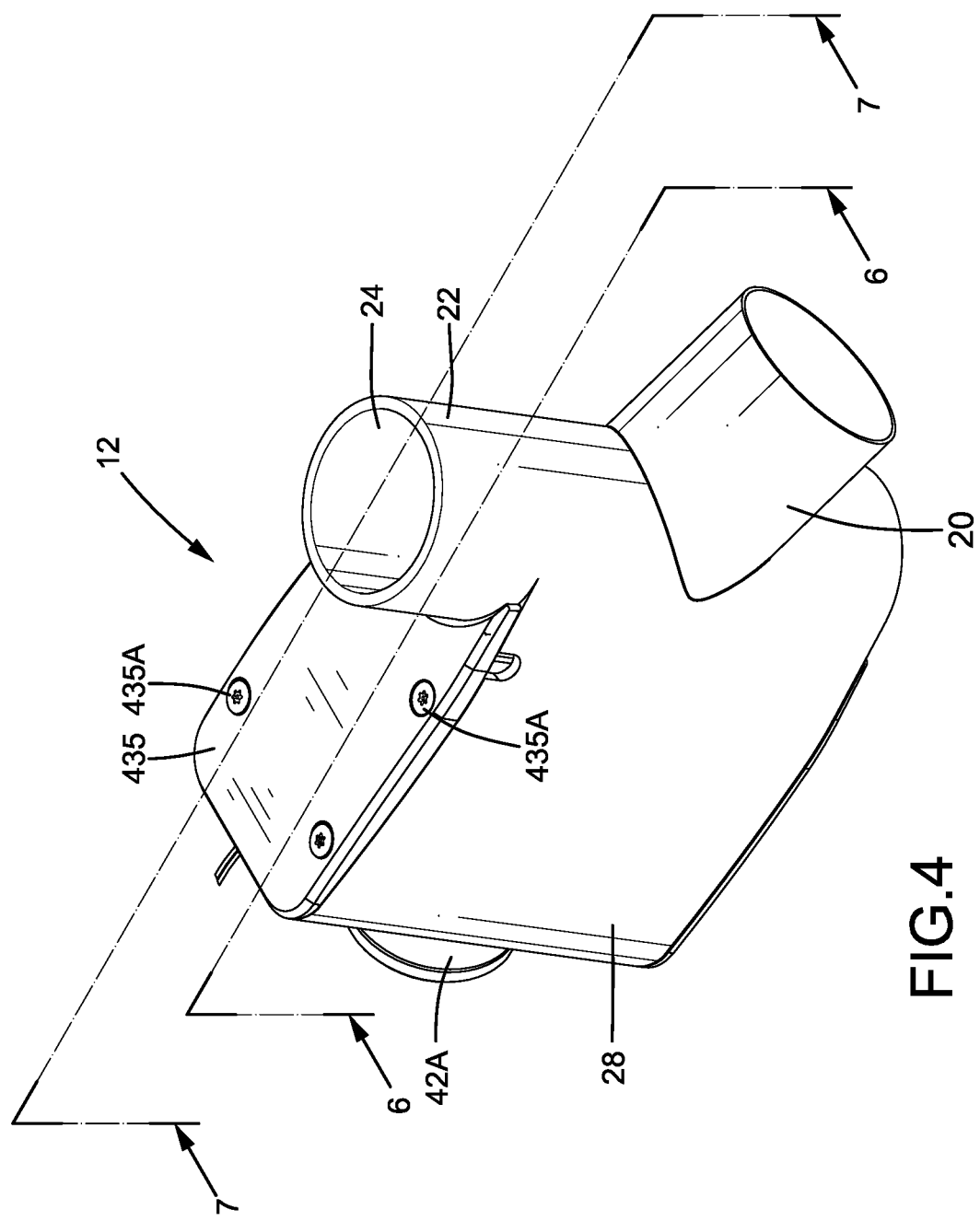
FIG. 4 is a perspective view of the lock assembly of FIG. 1 after assembly.

With reference to FIG. 2, the lock device 50 further includes a detection module 311. The detection module 311 includes a base 313 and a first driver 331 mounted on the base 313. The first driver 331 can be formed by a motor. The first driver 331 further includes a cam 333 mounted on an output shaft thereof. The detection module 311 further includes a first sensor 315, a second sensor 317, and a third sensor 319. The third sensor 319 is adjacent to the cam 333. The cam 333 can press against the third sensor 319 which is used to confirm that the cam 333 has rotated 360°.

With reference to FIGS. 6 and 7, the detection module 311 is received in a bottom of the installation space 54A of the frame 52. The base 313 is screwed to the two sidewalls 54 of the frame 52. The cam 333 is located below the push portion 160 of the unlocking member 153. The first sensor 315 is located below the second unit 240 of the locking unit 232. Thus, the second unit 240 presses against the first sensor 315 after the second unit 240 has pivoted through an angle (FIG. 10), and the cam 333 presses against the third sensor 319 after the cam 333 has pivoted through an angle (FIG. 7).

Figure 9:
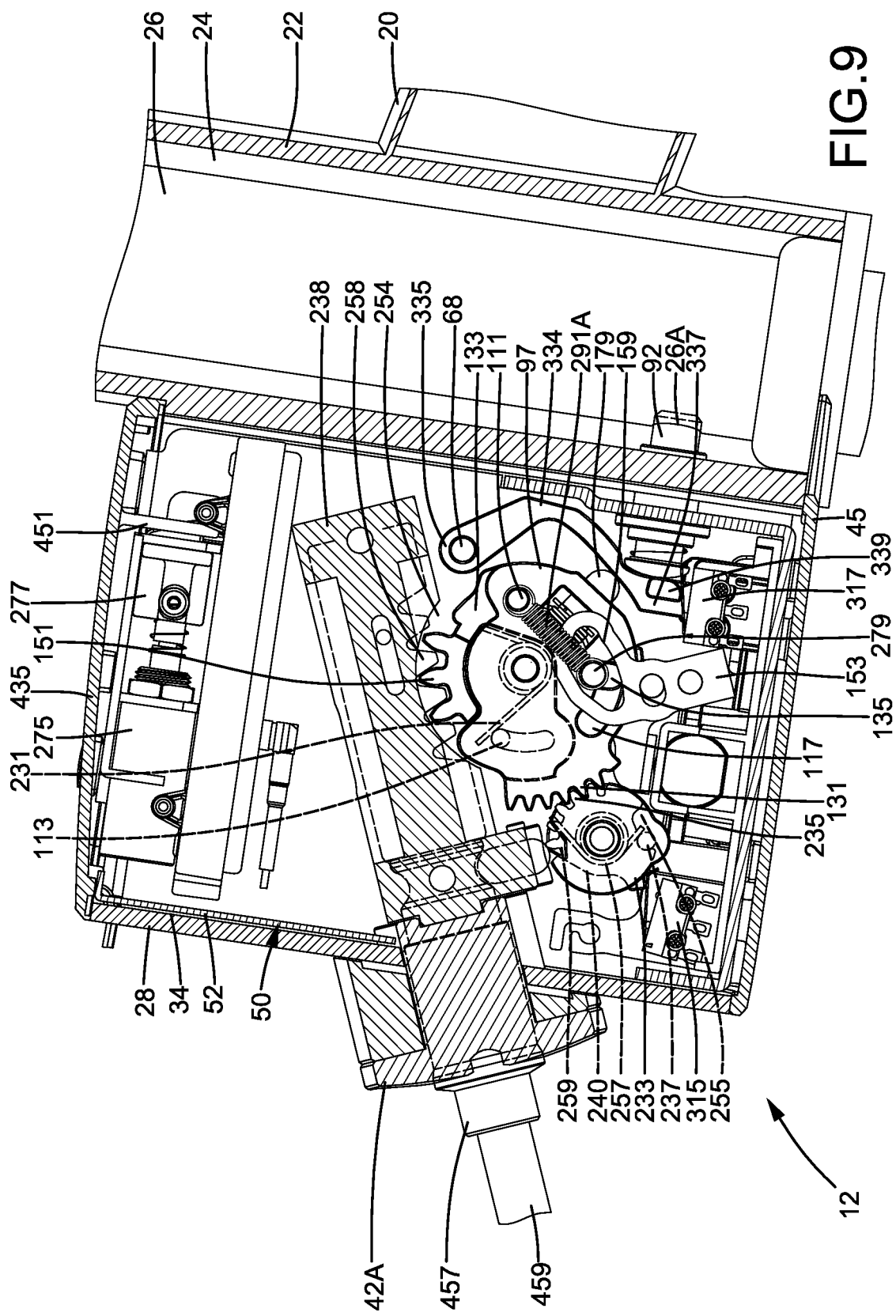
FIG. 9 is a view similar to FIG. 8, with the tappet moved to a rear position.

The lock device 50 further includes a linking rod 334 and a pin module 87. The linking rod 334 is pivotably mounted in the installation space 54A of the frame 52 and includes a pivotal portion 335 and a pressing end 337. The linking rod 334 further includes an extension 339 formed on a side of the pressing end 337. The pivotal portion 335 of the linking rod 334 is pivotably mounted around the third axle 68. The push member 179 of the control unit 95 abuts a side of the linking rod 334. The extension 339 of the linking rod 334 is located above the second sensor 317 (FIG. 6). When the follower member 97 of the control unit 95 pivots, the push member 179 pushes the linking rod 334 to pivot about the third axle 68. After the linking rod 334 has pivoted through an angle, the extension 339 presses against the second sensor 317 (FIG. 9).

The pin module 87 is mounted to the frame 52 and includes a sleeve 88 securely mounted in a coupling groove 55 in a bottom of the frame 52. The sleeve 88 includes a sleeve hole 90, and a locking rod 92 is slideably received in the sleeve hole 90 of the sleeve 88. An unlocking spring 94 is mounted between the locking rod 92 and the sleeve 88. The locking rod 92 is movable along the sleeve 88 to an extended position (FIG. 9) or a retracted position (FIG. 7). The follower member 97 pivots to actuate the pressing end 337 of the linking rod 334 to thereby press against an end of the locking rod 92, which, in turn, moves from the retracted position to the extended position. The unlocking spring 94 biases the locking rod 92 to the retracted position.

Figure 17:
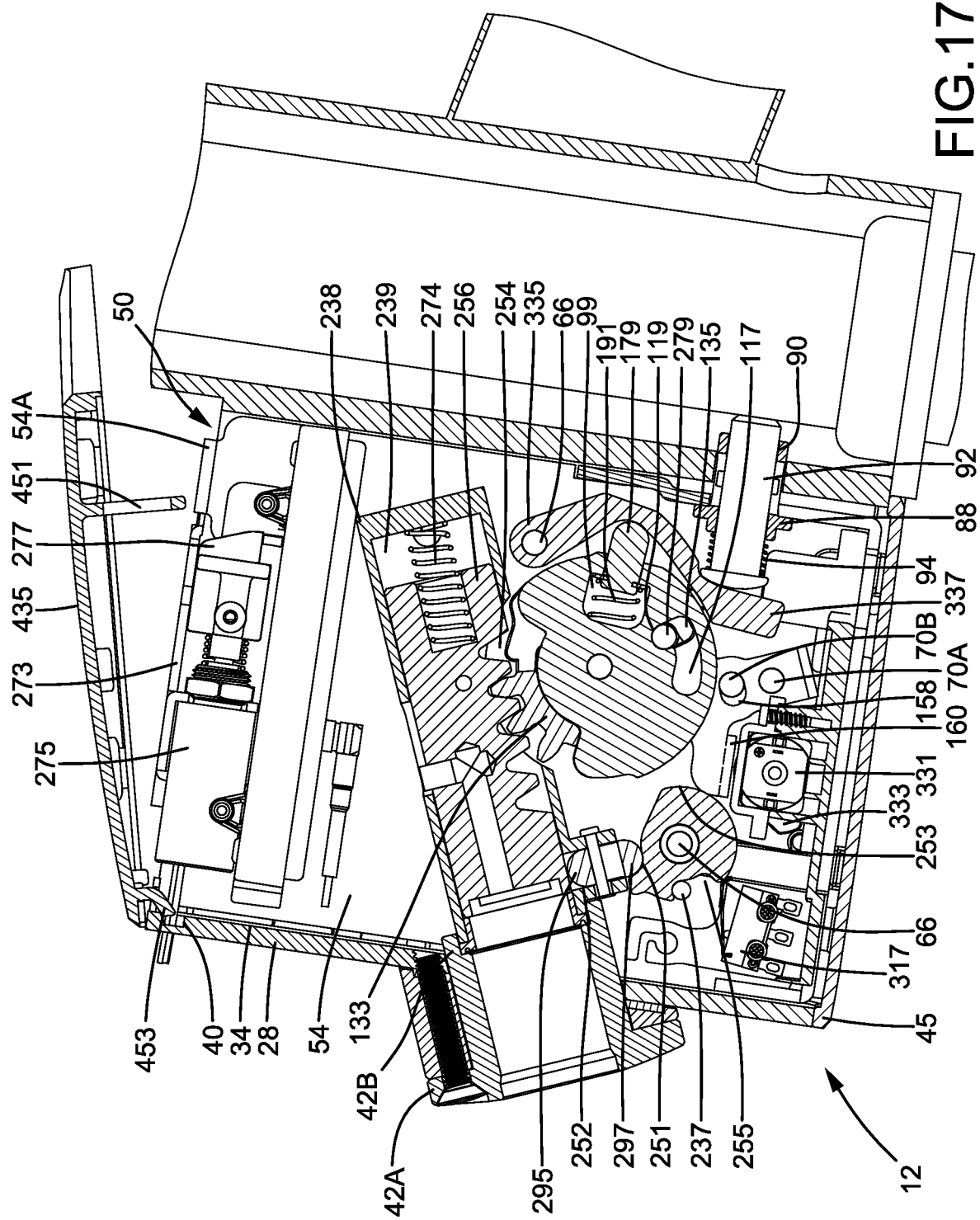
FIG. 17 is a view similar to FIG. 16, with a latch moved to a non-coupling position and with an upper lid removed.

The lock device 50 further includes a safety device 272 received in the installation space 54A of the frame 52. The safety device 272 includes a bracket 273 screwed to the two sidewalls 54 of the frame 52. The safety device 272 further includes a second driver 275 securely mounted to the bracket 273 and a latch 277 coupled to the second driver 275. The second driver 275 can be an electromagnetic valve and operates to move the latch 277 between a coupling position (FIG. 7) and a non-coupling position (FIG. 17).

The lock device 50 is used to lock a lock head 457. The lock head 457 includes an engaging groove 457A in an outer periphery thereof. A rear end of the lock head 457 is adapted to couple with a cable 459 that is made of metal. Furthermore, the lock head 457 has an outer diameter slightly larger than the coupling hole 310 of the ring 299. The lock head 457 can extend through the insertion groove 239 of the jacket 238 and can be locked by the engaging member 293 in the engagement position (FIG. 10), avoiding disengagement from the lock device 50.

The lock assembly 12 can be mounted on a vehicle 10, such as a bicycle, a motorcycle, etc. The vehicle 10 includes a shaft tube 22 having an axial hole 24. The lock assembly 12 further includes a casing 28 mounted around the shaft tube 22. The casing 28 includes an upper end 28A and a lower end 28B. The casing 28 further includes a compartment 34 extending from the upper end 28A through the lower end 28B. The casing 28 further includes a coupling groove 40 defined in an inner face delimiting the compartment 34. Two through-holes 42 and 44 are defined in a peripheral wall of the casing 28 and are spaced from the coupling groove 40. The axial hole 24 and the compartment 34 are intercommunicated by the through-hole 44. The housing 28 further includes a plurality of coupling columns 38 on an inner peripheral face of the peripheral wall. The lock device 50 is received in the compartment 34 of the casing 28. The plurality of upper engaging portions 54B of the frame 52 respectively abuts the plurality of coupling columns 38. The jacket 238 of the tappet mechanism 234 of the lock device 50 is aligned with the through-hole 42 of the casing 28. The pin module 87 is received in the through-hole 44 of the casing 28 (see FIG. 7).

The lock assembly 12 further includes a cap 42A having a coupling portion 42B. The cap 42A is fixed on the casing 28, and the coupling portion 42B is received in the through-hole 42. The coupling portion 42B is coupled with the jacket 238 of the tappet mechanism 234 (see FIG. 7). A coupling hole 42C extends from an end face of the cap 42A through another end face of the cap 42A. The coupling portion 42B includes the other end face of the cap 42A. The coupling hole 42C has an inner diameter slightly larger than the outer diameter of the lock head 457.

The lock assembly 12 further includes an upper lid 435 and a lower lid 45. The upper lid 435 includes an inner surface 437, an engaging block 453 formed on the inner surface 437, and a latch hole 451. The lower lid 45 includes a plurality of engaging portions 47 corresponding to the plurality of lower engaging portions 54C. The upper lid 435 is slightly larger than the compartment 34 of the casing 28. The lower lid 45 is also slightly larger than the compartment 34 of the casing 28.

Figure 5:
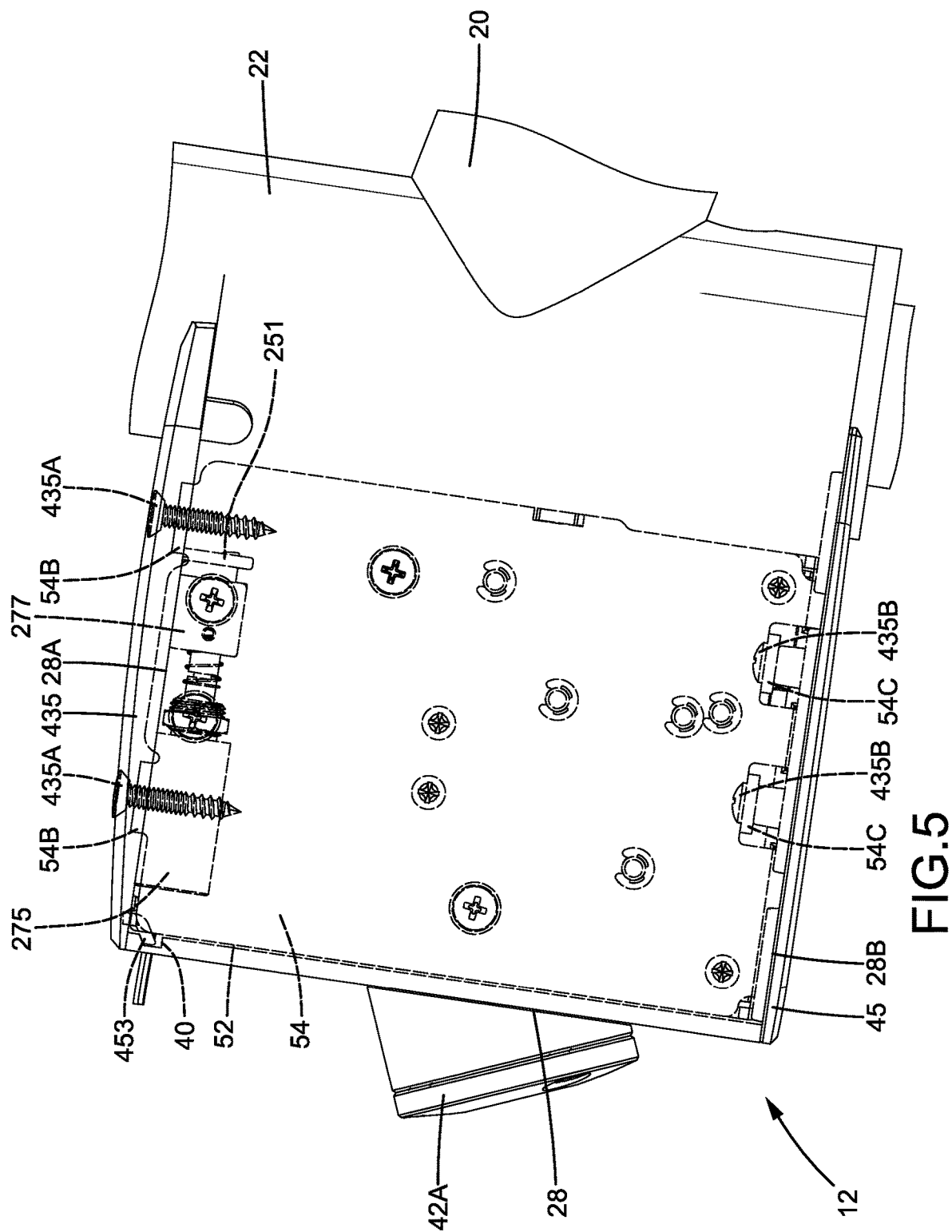
FIG. 5 is a side view of the lock assembly of FIG. 4.

The lower lid 45 abuts the lower end 28B of the casing 28. The plurality of engaging portions 47 of the lower lid 45 is respectively aligned with the plurality of lower engaging portions 54C of the frame 52. A plurality of lower screws 435B is used to couple the plurality of engaging portions 47 and the plurality of lower engaging portions 54C. The inner surface 437 of the upper lid 435 abuts the upper end 28A of the casing 28. A plurality of upper screws 435A extends through the upper lid 435 to couple the plurality of upper engaging portions 54B with the plurality of coupling columns 38 (see FIG. 5). Furthermore, the latch 277 of the safety device 272 is coupled with the latch hole 451 of the upper lid 435 (see FIG. 7). When the latch 277 is in the coupling position, the upper lid 435 cannot be detached from the casing 28 even if the plurality of upper screws 435A has been removed, because the latch hole 451 is coupled with the latch 277 and the engaging block 453 of the upper lid 435 is coupled with the coupling groove 40 of the casing 28. Furthermore, the lock device 50 is restricted by the lower lid 45 and, thus, cannot be removed from the compartment 34 of the casing 28. Thus, the lock device 50 is reliably received inside the casing 28 without the risks of detachment and destruction.

Figure 16:
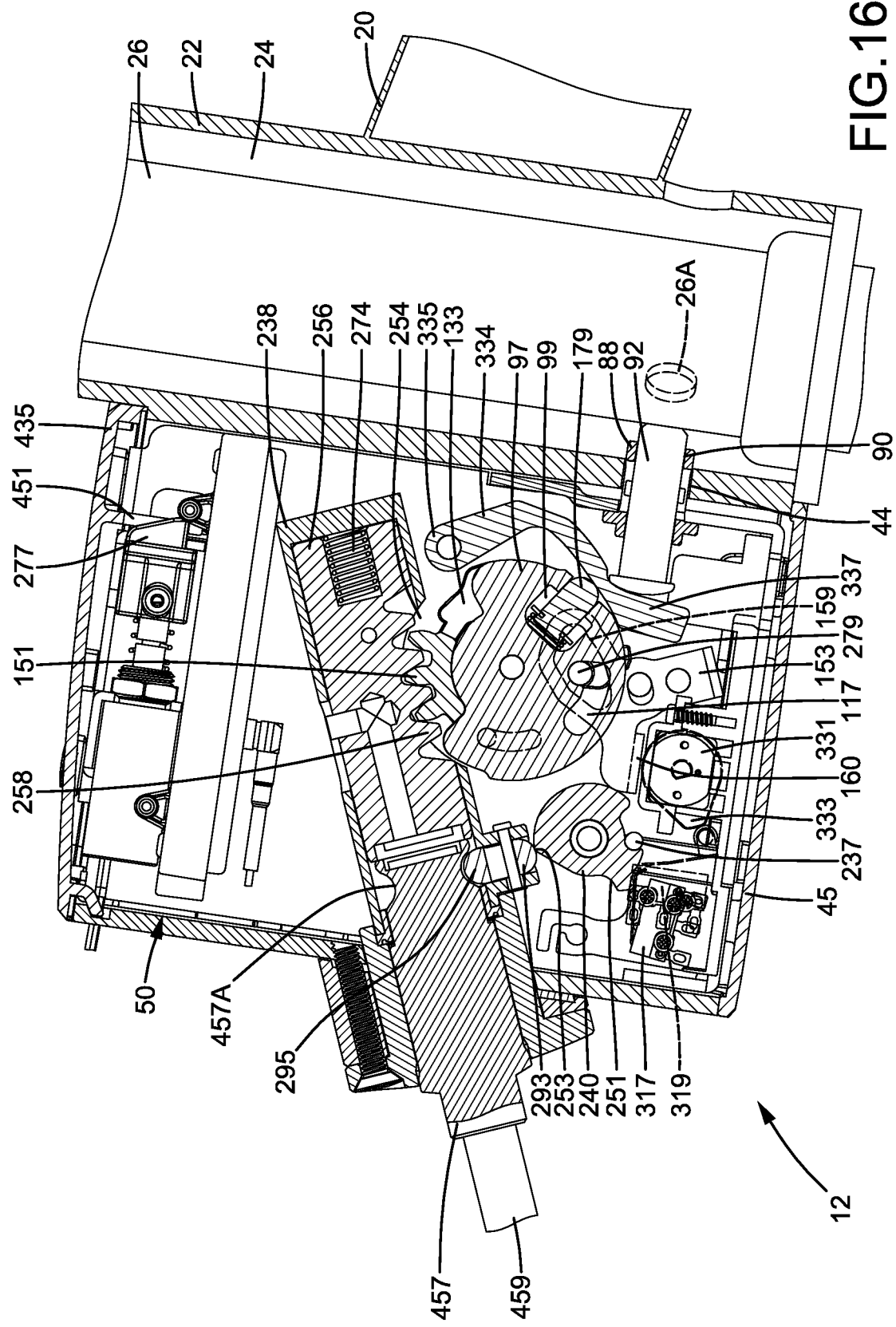
FIG. 16 is a view similar to FIG. 10, with a locking hole of the vehicle not aligned with the follower pin and with the tappet moved by the lock head to the rear position.

With reference to FIGS. 7 and 16, when the lock assembly 12 is used on the vehicle 10, an end of the cable 459 remote to the lock head 457 is fixed on the vehicle frame 20 of the vehicle 10. An object 26 is received in the shaft tube 22. In this embodiment, the vehicle 10 is a bicycle, the shaft tube 22 is a head tube, and the object 26 received in the shaft tube 22 is a steering rod. The object 26 includes a locking hole 26A. The vehicle 10 further includes an electronic controller 27 electrically connected to the lock device 50. The electronic controller 27 is configured to control operation of the lock device 50.

For the sake of explanation, it will be assumed that the lock head 457 does not extend into the tappet mechanism 234, the tappet 256 is biased to the front position, the unlocking member 153 is in the non-pressing position, the follower pin 279 is biased to the first position, and the locking rod 92 is biased to the retracted position. In this state, the object 26 in the form of the steering rod of the vehicle 10 can be pivoted under operation of the cyclist to control the moving direction of the vehicle 10. Furthermore, the lower portion 251 of the second unit 240 of the locking unit 232 is aligned with the abutting end 297 of the engaging member 293, such that the engaging member 293 is in the disengagement position.

Figure 15:
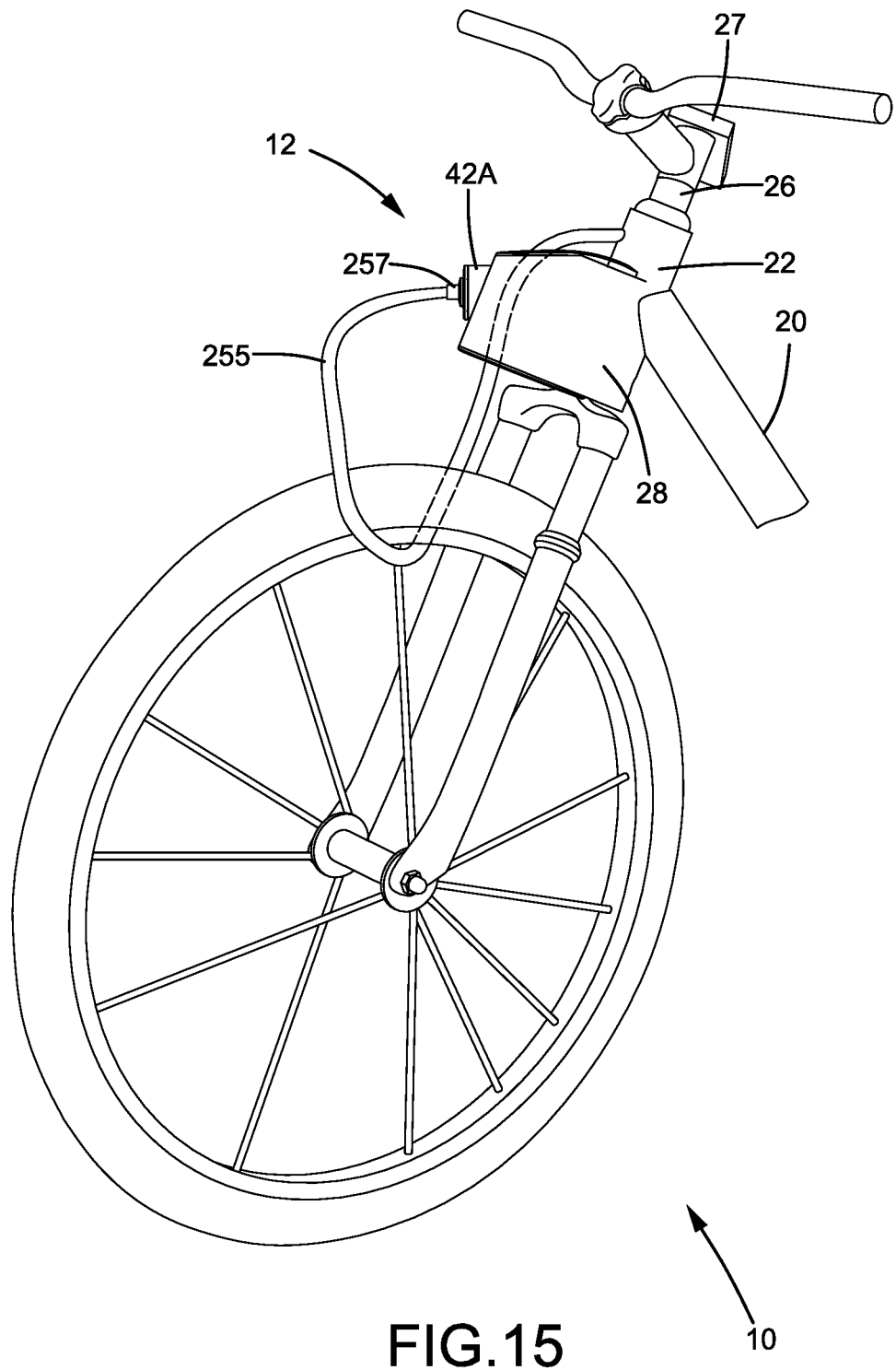
FIG. 15 is a diagrammatic perspective view similar to FIG. 14, with the lock assembly being in a locking state.

When it is desired to lock the vehicle 10, the object 26 in the form of the steering rod is pivoted through an angle (generally leftward as viewed from the cyclist's direction) to align the locking hole 26A with the through-hole 44 of the casing 28. Furthermore, the cable 459 of the lock head 457 extends through a wheel of the vehicle 10, and the lock head 457 extends through the coupling hole 42C of the cap 42A into the insertion groove 239 of the jacket 238 (see FIG. 15). Thus, the lock head 457 pushes the tappet 256 from the front position (FIG. 7) to the rear position (FIG. 10) while compressing the tappet spring 274, as shown in FIGS. 8 and 9.

Figure 8:
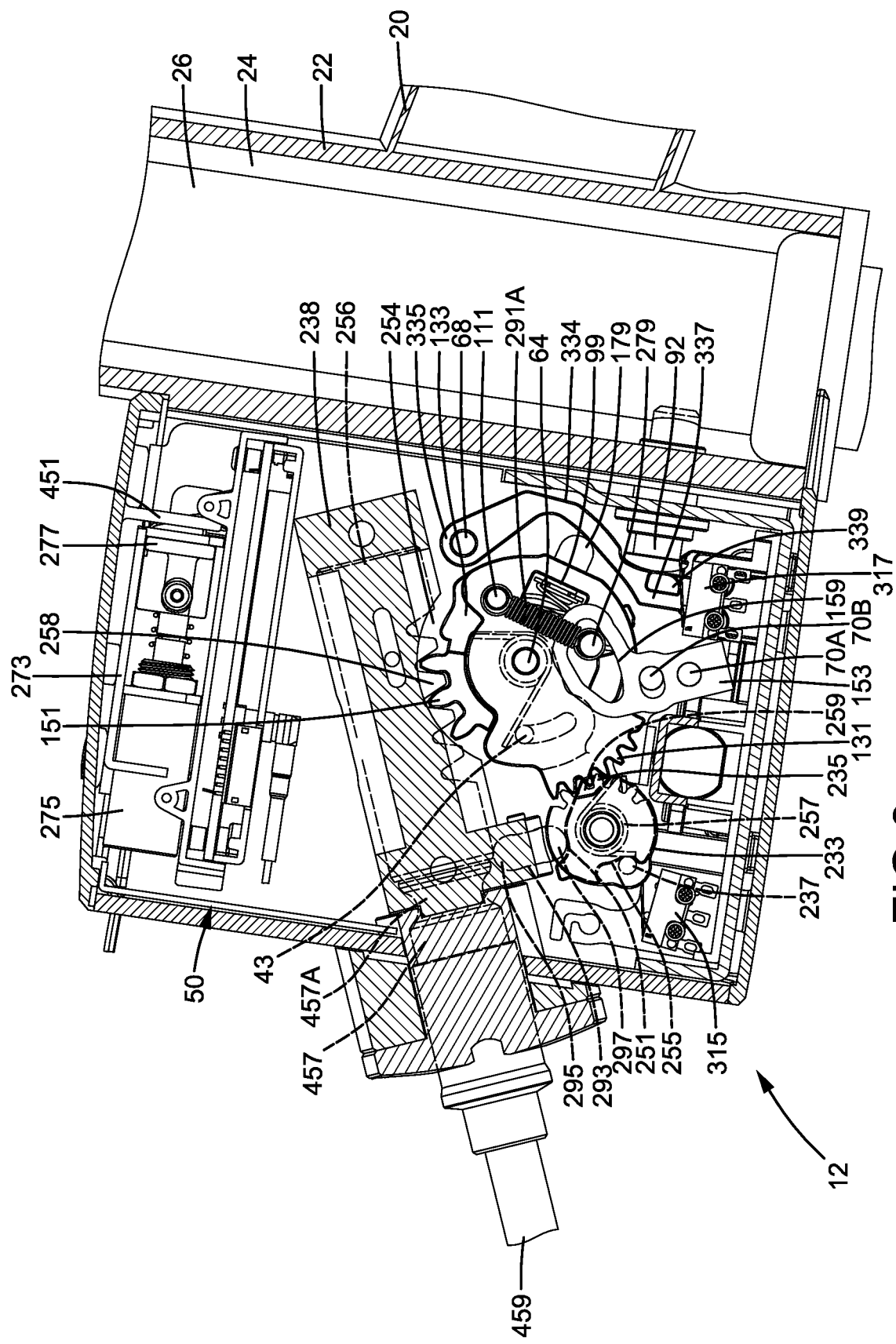
FIG. 8 is a view similar to FIG. 6, with a lock head moved into the lock device and pressing a tappet rearward.

With reference to FIG. 8, when the tappet 256 moves from the front position to the rear position, the tappet 256 drives the driving member 133 to pivot. Since the follower pin 279 is in the first position, the follower member 97 pivots together with the driving member 133. The first unit 233 of the locking unit 232 is driven by the follower member 97 to pivot. However, since the limiting rod 237 is in an end of the limiting recess 255 of the second unit 240, when the lock head 457 starts to push the tappet 256 through a small distance toward the rear position, the first unit 233 alone pivots relative to the second unit 240 until the limiting rod 237 of the first unit 233 reaches the other end of the limiting recess 255. The tappet 256 continues to move toward the rear position, the first unit 233 pushes the second unit 240 through the limiting rod 237, such that the first unit 233 and the second unit 240 pivot jointly. Before the lock head 457 reaches a position where the engaging groove 457A is aligned with the through-hole 252 of the jacket 238, the engaging member 293 remains in the disengagement position, because the second unit 240 does not pivot in the beginning.

When the tappet 256 moves toward the rear position, the follower member 97 pivots, such that the push member 179 actuates the linking rod 334 to pivot. Since the pressing end 337 of the linking rod 334 moves the locking rod 92 from the retracted position to the extended position while compressing the unlocking spring 94. Since the second toothed portion 131 meshes with the driven toothed portion 235, the first unit 233 of the locking unit 32 and the follower member 97 simultaneously pivot in opposite directions. Furthermore, the limiting rod 237 of the first unit 233 presses against an inner wall of the limiting recess 255 of the second unit 240 to pivot the second unit 240. Thus, the second unit 240 moves from a position in which the lower portion 251 is aligned with the engaging member 293 (FIG. 7) to another position in which the upper portion 253 is aligned with the engaging member 293, thereby moving the engaging member 293 from the disengagement position to the engagement position.

With reference to FIG. 10, when the lock head 457 moves the tappet 256 to the rear position, the engaging groove 457A of the lock head 457 is aligned with the through-hole 252 of the jacket 238, and the engaging member 293 moves to the engagement position. Thus, the engaging end 295 of the engaging member 293 engages with the engaging groove 457A of the lock head 457 to lock the lock head 457. As a result, the tappet 256 is retained in the rear position, and the locking rod 92 is moved to the extended position. A distal end of the locking rod 92 engages with the locking hole 26A. Consequently, the object 26 in the form of the steering rod cannot be operated for changing the moving direction of the vehicle 10, and the tire of the vehicle 10 is restricted by the cable 459 and, thus, cannot pivot, thereby locking the vehicle 10.

It is noted that when the engaging member 293 is in the engagement position, the second unit 240 presses against the first sensor 315. Furthermore, when the locking rod 92 is in the extended position, the extension 339 of the linking rod 337 presses against the second sensor 317. Thus, an electronic signal can be outputted to the electronic controller 27 to identify that the vehicle 10 is in a locking state.

Figure 12:
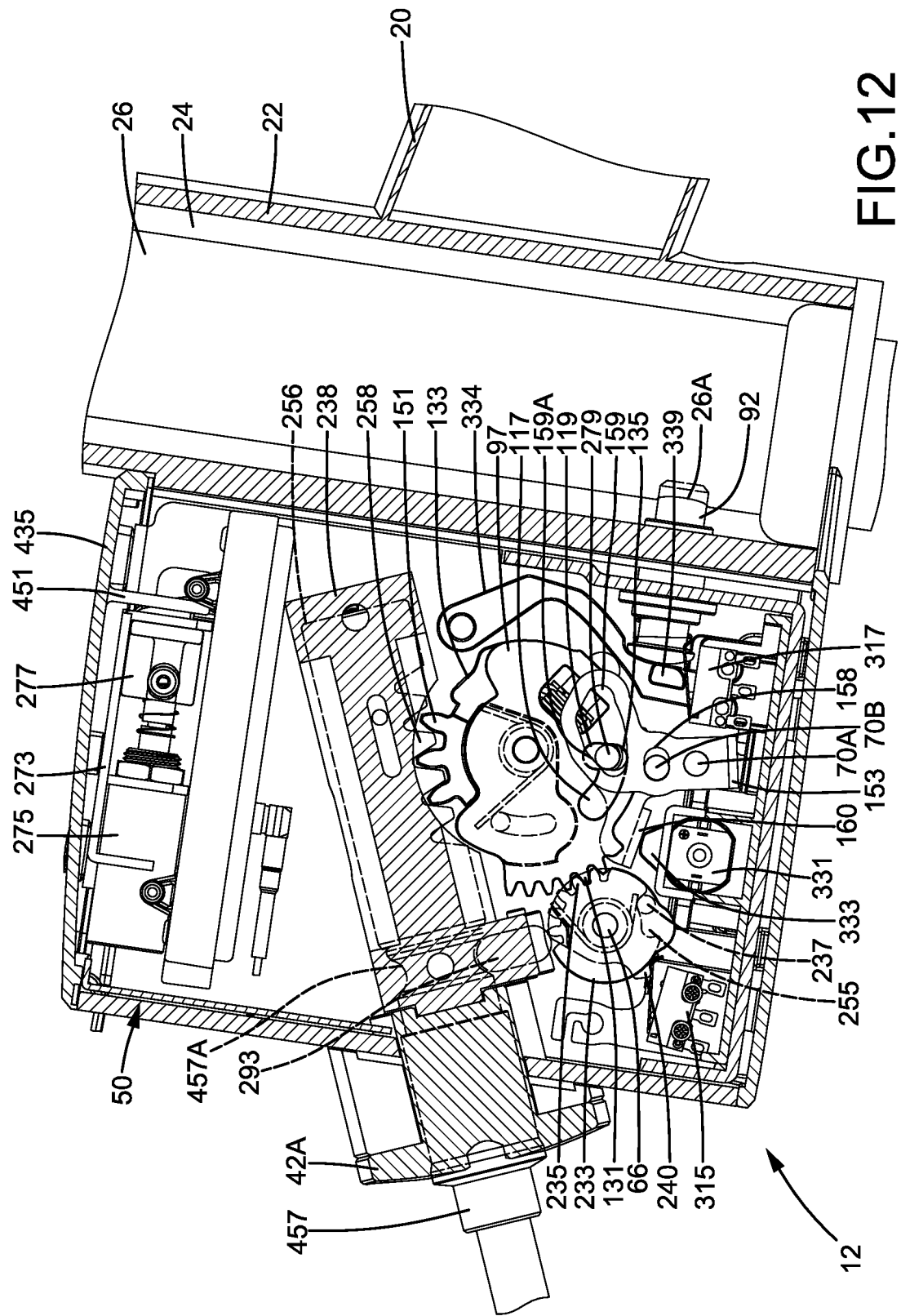
FIG. 12 is a view similar to FIG. 9, with the unlocking member pivoted to the pressing position and with the follower pin moved to the second position.

When it is desired to unlock, an unlocking information (such as a pin code, a fingerprint, a smart card, etc.) can be inputted by using the electronic controller 27 of the vehicle 10, and the electronic controller 27 outputs an unlocking signal to the lock device 50 to actuate the first driver 331. The cam 333 pivots to press against the push portion 160 of the unlocking member 153, pivoting the unlocking member 153 from the non-pressing position (FIGS. 7 and 9) to the pressing position (FIGS. 11 and 12). Each pressing side 159A of the unlocking member 153 presses against and moves the follower pin 279 from the first position (FIGS. 7 and 9) to the second position (FIGS. 11 and 12).

With reference to FIGS. 11 and 12, when the follower pin 279 reaches the second position, the follower pin 279 is in the movement portion 117 of the follower member 97, such that the follower member 97 is released and, thus, can pivot independently relative to the driving member 133. Furthermore, the return spring 231 biases the follower member 97 to pivot alone relative to the driving member 133. In this case, since the lock head 457 still engages with the engaging member 293, the tappet 256 is retained in the rear position, and the driving member 133 does not pivot. Nevertheless, the follower member 97 actuates the first unit 233 and the second unit 240 to pivot together (but the driving member 133 does not pivot), and the push member 179 releases the linking rod 334 when the follower member 97 pivots, such that the locking rod 92 moves from the extended position to the retracted position under the bias of the unlocking spring 94.

Figure 13:
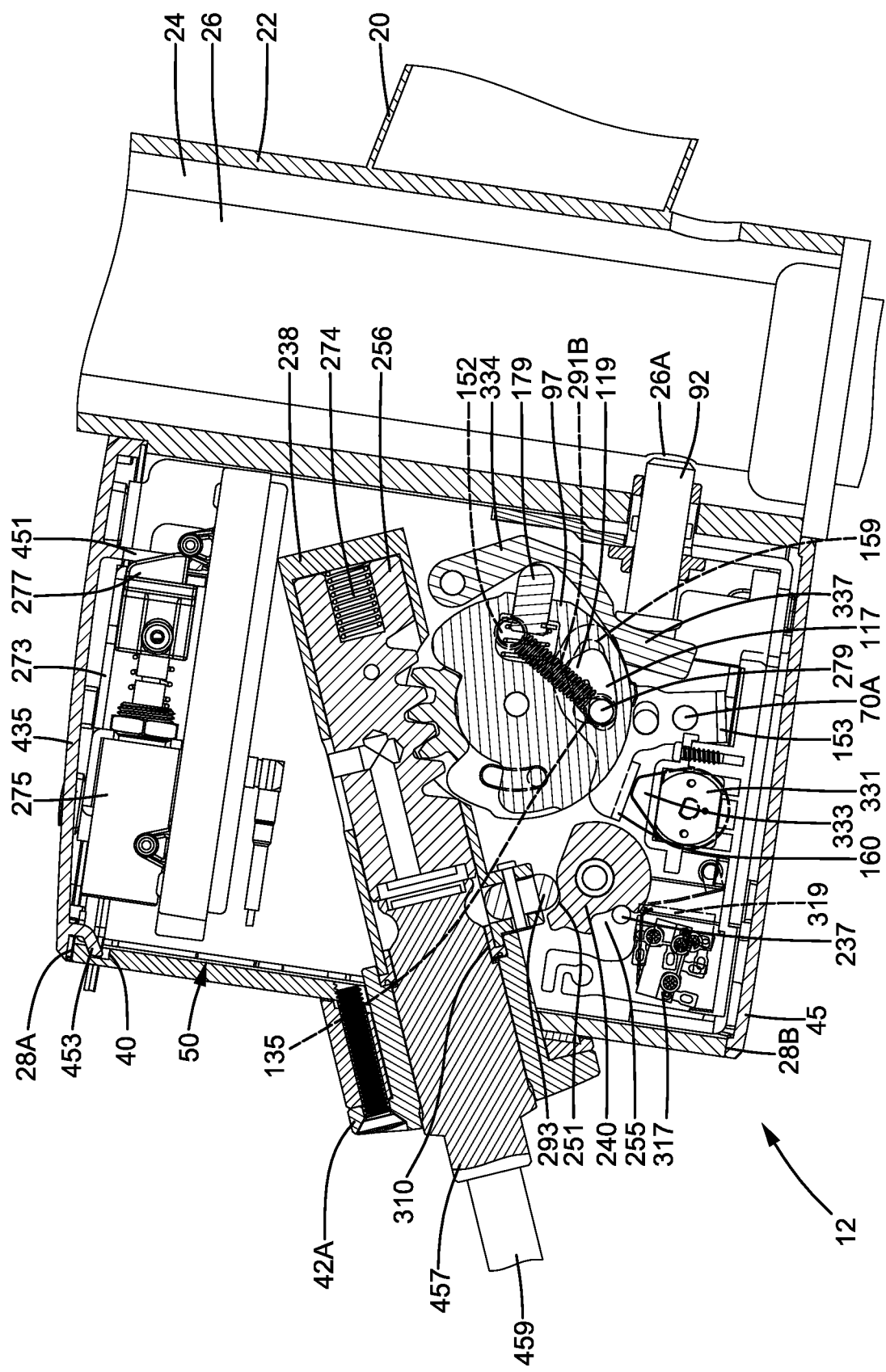
FIG. 13 is a view similar to FIG. 11, with the follower pivoted by a return spring to move an engaging member to a disengagement position.
Figure 14:
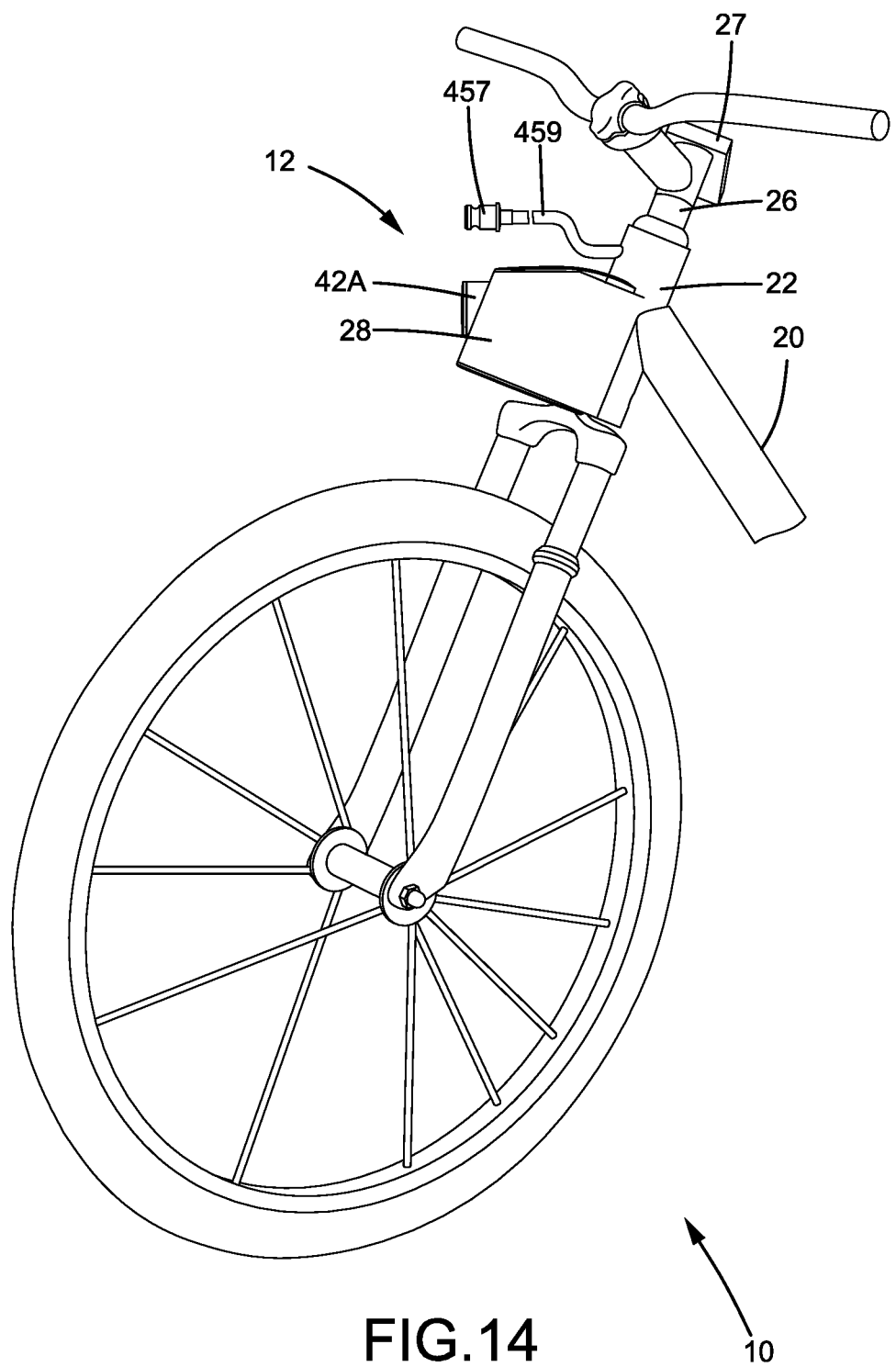
FIG. 14 is diagrammatic perspective view illustrating use of the lock assembly on a vehicle and with the lock assembly being in an unlocking state.

With reference to FIG. 13, the second unit 240 pivots to a position where the lower portion 251 is aligned with the engaging member 293, and the engaging member 293 moves to the disengagement position. In this state, the follower pin 297 pivots together with the follower member 97 to an end of the movement portion 117 remote to the positioning portion 119, as shown in FIG. 13. The first guiding groove 135 of the driving member 133 is misaligned from the positioning portion 119 of the follower member 97. Thus, the lock head 457 is released, such that the tappet 256 moves from the rear position to the front position under the bias of the tappet spring 274, and the lock head 457 is also moved. Furthermore, the tappet 256 actuates the driving member 133 to pivot alone relative to the follower member 97. After the tappet 256 reaches the front position, the driving member 133 is in a position in which the first guiding groove 135 is aligned with the positioning portion 119 of the follower member 97. The follower pin 279 is biased to the first position (FIG. 7) in the positioning portion 119 under the action of the first and second tension springs 291A and 291B. Then, the lock head 457 can be detached from the lock device 50 and the casing 28, and the cable 459 can be detached from the wheel of the vehicle 10. Furthermore, the locking rod 92 moves to the retracted position disengaging from the locking hole 26A. Thus, the object 26 in the form of the steering rod of the vehicle 10 is pivotable, and the vehicle 10 is in the unlocked state.

With reference to FIGS. 7 and 16, in a case that the lock head 457 is moved into the tappet mechanism 234 while the object 26 in the form of the steering rod of the vehicle 10 is pivoted to a position in which the locking hole 26A is not aligned with the through-hole 44 of the casing 28, the locking rod 92 is in the retracted position and abuts against a surface of the object 26 but cannot move to the extended position. Thus, when the lock head 457 moves the tappet 256 to the rear position to pivot the follower member 97, the push member 179 cannot pivot the linking rod 334 and is actuated by the linking rod 179 to compress the pressing spring 191 and moves into the receiving groove 99. Thus, even though the locking hole 26A is not aligned with the through-hole 44 of the casing 28, the lock head 457 can still be locked. Furthermore, in a case that the tappet 256 is in the rear position and the locking rod 92 is in the retracted position, if the object 26 pivots to the position where the locking hole 26A is aligned with the through-hole 44 of the casing 28, the pressing spring 191 still biases the push member 179 to pivot the linking rod 334, such that the locking rod 92 moves from the retracted position to the extended position to engage with the locking hole 26A, thereby locking the object 26. Furthermore, since the outer diameter of the lock head 457 is slightly larger than the inner diameter of the coupling hole 310 of the ring 299, the lock head 457 in the locked state is in sealing contact with the ring 299, preventing water, dust or impurities in the ambience from entering the lock assembly 12.

When the latch 277 of the safety device 272 of the lock assembly 12 is in the coupling position, the upper lid 435 cannot be detached even if the plurality of upper screws 435A is removed. As a result, when it is desired to repair or maintain the lock device 50, an unlocking safety signal can be inputted through the electronic controller 27 to actuate the second driver 275 of the safety device 272, moving the latch 277 from the coupling position (FIG. 7) to the non-coupling position (FIG. 17). Thus, the latch 277 disengages from the latch hole 451 of the upper lid 435. Then, the plurality of upper screws 435A is removed to permit detachment of the upper lid 435 from the casing 28. Next, the plurality of lower screws 435B is removed to permit removal of the lock device 50 from the compartment 34 of the casing 28 for repair or maintenance.

When the engaging member 293 is supported by the second unit 240 and engages with the engaging groove 457A of the lock head 457 while the tappet 256 is in the rear position, the lock head 457 can be reliably locked, and the engaging member 293 would not loosen under vibrations resulting from external forces.

The locking rod 92 can lock the object 26 when the tappet 256 is in the rear position, such that the lock head 457 and the object 26 can be locked by a single lock device 50.

The safety device 272 cooperates with the upper lid 435 to reliably prevent undesired easy removal of the lock device 50 from the casing 28 while permitting easy removal of the lock device 50 from the compartment 34 of the casing 28 by moving the latch 277 to the non-coupling position for repair or maintenance.

The operations and positions of the linking rod 334, the locking unit 232, and the cam 333 can be detected through use of the first, second, and third sensors 315, 317, and 319. Furthermore, electronic signals can be outputted to permit the system to identify the lock assembly 12 is in the locking state or the unlocking state, providing easy, electronic control of the lock assembly 12.

Now that the basic teachings of the present invention have been explained, many extensions and variations will be obvious to one having ordinary skill in the art. For example, the lock assembly 12 can be disposed in locations other than vehicles. Furthermore, the lock assembly 12 does not have to include the casing 28, the safety device 272, the upper lid 435, and the lower lid 45 if desired.

Furthermore, the first driver 331 can be a mechanism other than a motor. For example, the first driver 331 can be a cylinder operable by a key and interlocked with the cam 333, such that the key can be used to pivot the cylinder to actuate the cam 33 which, in turn, pivots the unlocking member 153 to the pressing position or the non-pressing position.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:

1. A lock assembly comprising a lock device, with the lock device including:
   a frame including an installation space;
   a tappet mechanism mounted in the installation space of the frame, wherein the tappet mechanism includes a tappet movable between a front position and a rear position, and wherein the tappet is biased to the front position;
a driving member pivotably mounted in the installation space of the frame and interlocked with the tappet, wherein the driving member includes a first guiding groove, and wherein the driving member is actuated to pivot when the tappet moves between the front position and the rear position;
a follower member pivotably mounted in the installation space of the frame and including a guiding slot, wherein the guiding slot includes a movement portion and a positioning portion intersecting with the movement portion;
a return spring mounted between the driving member and the follower member, wherein the return spring biases the follower member;
an unlocking member pivotably mounted in the installation space of the frame and including a movement groove, wherein the movement groove includes a pressing side, and wherein the unlocking member is movable between a pressing position and a non-pressing position;
a follower pin movably received in the first guiding groove, the guiding slot, and movement groove, wherein the follower pin is movable to a first position in the positioning portion or a second position in the movement portion, wherein the follower pin is in the first position when the unlocking member is in the non-pressing position, wherein the follower pin is in the second position when the unlocking member is in the pressing position, wherein the driving member and the follower member pivot jointly when the follower pin is in the first position, and wherein the follower member is independently pivotable relative to the driving member when the follower pin is in the second position;
a locking unit received in the installation space of the frame and interlocked with the follower member, wherein the locking unit includes an engaging member, wherein the engaging member moves between an engagement position and a disengagement position when the follower member pivots, wherein the engaging member is in the disengagement position when the tappet is in the front position, and wherein the engaging member is in the engagement position when the tappet is in the rear position;
a first driver mounted in the installation space of the frame, wherein the first driver interlocks with and is jointly moveable with the unlocking member between the pressing position and the non-pressing position;
a lock head selectively extended into the tappet mechanism, wherein the lock head includes an engaging groove,
wherein when the lock head is outside of the tappet mechanism, the tappet is in the front position, and the follower pin is in the first position,
wherein when the lock head extends into the tappet mechanism and moves the tappet to the rear position, the engaging groove of the lock head engages with the engaging member of the locking unit, the follower pin is in the first position, and the lock head is in a locked state, and
wherein when the follower pin is moved to the second position while the lock head is in the locked state, the return spring biases the follower member to independently pivot relative to the driving member to move the engaging member from the engagement position to the disengagement position, the tappet moves from the rear position to the front position, permitting the lock head to disengage from the tappet mechanism.

2. The lock assembly as claimed in claim 1, wherein the locking unit further includes:
a first unit pivotably mounted in the installation space of the frame and interlocked with the follower member, wherein pivotal movement of the follower member causes pivotal movement of the first unit, and
a second unit pivotably mounted in the installation space of the frame and interlocked with the first unit, wherein the second unit includes a lower portion and a higher portion, wherein the engaging member abuts against the second unit, wherein pivotal movement of the first unit causes pivotal movement of the second unit to a first position in which the lower portion is aligned with the engaging member or a second position in which the higher portion is aligned with the engaging member,
wherein when the tappet is in the front position, the lower portion of the second unit is aligned with the engaging member, and the engaging member is in the disengagement position, and
wherein when the tappet is in the rear position, the higher portion of the second unit is aligned with the engaging member, and the engaging member is in the engagement position.

3. The lock assembly as claimed in claim 2, wherein locking unit further includes:
a biasing spring mounted between the first unit and the second unit, wherein the second unit further includes a limiting recess and a protrusion, wherein the lower portion is located between the limiting recess and the higher portion in a circumferential direction about a pivoting axis of the second unit, wherein the first unit further includes a limiting rod received in the limiting recess, and wherein the biasing spring abuts against the limiting rod of the first unit and the protrusion of the second unit and biases the second unit,
wherein when the tappet is in the front position, the limiting rod abuts against an end of the limiting recess, and
wherein when the tappet moves from the front position to the rear position, the follower member actuates the first unit to independently pivot relative to the second unit until the limiting rod moves to and presses against another end of the limiting recess, and the first unit and the second unit jointly pivot until the lock head is in the locked state.

4. The lock assembly as claimed in claim 2, wherein the tappet includes a toothed portion on an outer periphery thereof, wherein the driving member includes a first toothed portion meshed with the toothed portion of the tappet, wherein the follower member includes a second toothed portion on an outer periphery thereof, and wherein the first unit includes a driven toothed portion meshed with the second toothed portion of the follower member.

5. The lock assembly as claimed in claim 1, wherein the tappet mechanism includes:
a jacket fixed in the installation space of the frame, wherein the jacket includes an insertion groove and a through-hole intercommunicated with the insertion groove, wherein the jacket further includes an opening intercommunicated with the insertion groove and spaced from the through-hole, wherein the tappet movable between the front position and the rear position is received in the insertion groove, wherein a portion of the tappet is exposed via the opening, wherein the engaging member movable between the engagement position and the disengagement position is received in the through-hole, wherein the driving member is coupled with the tappet via the opening; and a tappet spring received between the insertion groove of the jacket and the tappet, wherein the tappet spring biases the tappet toward the front position.

6. The lock assembly as claimed in claim 1, wherein the unlocking member further includes a push portion located outside of the movement groove, wherein the first driver further includes a cam located adjacent to the push portion, wherein the first driver drives the cam to rotate, wherein the cam is configured to press against the push portion of the unlocking member to pivot the unlocking member to one of the pressing position and the non-pressing position.

7. The lock assembly as claimed in claim 1, further comprising:

a casing including an upper end, a lower end, and a compartment extending from the upper end through the lower end, wherein the casing further includes an inner face having a coupling groove intercommunicated with the compartment and a through-hole extending from an outer periphery of the casing to the compartment, wherein the lock device is received in the compartment, wherein the tappet is aligned with the through-hole, wherein the frame of the lock device further includes a plurality of upper engaging portions formed on an upper end of an outer side thereof and a plurality of lower engaging portions formed on a lower end of the outer side thereof;

an upper lid including an engaging block corresponding to the coupling groove and a latch hole, wherein the upper lid is mounted to the upper end of the casing, wherein the engaging block engages with the coupling groove, wherein the upper lid and the plurality of upper engaging portions are screwed by a plurality of upper screws; and a lower lid mounted to the lower end of the casing, wherein the lower lid and the plurality of lower engaging portions of the frame are screwed by a plurality of lower screws, wherein the lock device further includes:

a safety device mounted in the installation space of the frame and located adjacent to the upper lid, wherein the safety device includes a second driver and a latch configured to be actuated by the second driver to move between a coupling position and a non-coupling position, wherein when the latch is in the coupling position, the latch engages with the latch hole of the upper lid, avoiding the upper lid from separating from the casing when the plurality of upper screws is removed, and wherein when the latch is in the non-coupling position, the latch disengages from the latch hole of the upper lid, permitting the upper lid to separate from the casing when the plurality of upper screws is removed.

8. The lock assembly as claimed in claim 1, further comprising:

a casing including a compartment and a shaft tube located outside of the compartment, wherein the shaft tube includes an axial hole, wherein the casing further includes a through-hole intercommunicating the compartment with the axial hole, and wherein the lock device is mounted in the compartment of the casing;

an object including a locking hole and movably received in the axial hole of the shaft tube;

a push member, wherein the follower member further includes a receiving groove, wherein the push member is movably received in the receiving groove, wherein the push member has an end protruding outside of the follower member and pivotable together with the follower member;

a linking rod pivotably received in the installation space of the frame and abutting an outer end of the follower member, wherein the linking rod includes a pressing end, wherein when the follower member pivots, the outer end of the follower member pivots the linking rod; and a pin module mounted in the installation space of the frame, wherein the pin module includes a locking rod movable between an extended position and a retracted position, wherein the locking rod is biased to the retracted position, wherein when the tappet is in the front position, the locking rod is in the retracted position, the locking rod is disengaged from the locking hole of the object, and the object is not locked, and wherein when the tappet is moved from the front position to the rear position, the linking rod pushes the locking rod from the retracted position to the extended position to engage with the locking hole of the object, and the object is locked.

9. The lock assembly as claimed in claim 7, further comprising:

an object including a locking hole, wherein the casing includes a compartment and a shaft tube located outside of the compartment, wherein the shaft tube includes an axial hole, wherein the casing further includes a through-hole intercommunicating the compartment with the axial hole, and wherein the object is movably received in the axial hole of the shaft tube;

a push member, wherein the follower member includes a receiving groove, wherein the push member is movably received in the receiving groove, wherein the push member has an end protruding outside of the follower member and is pivotable together with the follower member;

a linking rod pivotably received in the installation space of the frame and abutting an outer end of the follower member, wherein the linking rod includes a pressing end, wherein when the follower member pivots, the outer end of the follower member pivots the linking rod; and a pin module mounted in the installation space of the frame, wherein the pin module includes a locking rod movable between an extended position and a retracted position, wherein the locking rod is biased to the retracted position, wherein when the tappet is in the front position, the locking rod is in the retracted position, the locking rod is disengaged from the locking hole of the object, and the object is not locked, and wherein when the tappet is moved from the front position to the rear position, the linking rod pushes the locking rod from the retracted position to the extended position to engage with the locking hole of the object, and the object is locked.

10. The lock assembly as claimed in claim 7, wherein the lock head includes an end remote to the engaging groove, and wherein the end of the lock head is mounted on the casing.

11. The lock assembly as claimed in claim 1, further comprising:

a detection module including a base fixed in the installation space of the frame and located below the unlocking member, wherein the first driver is coupled to the base, wherein the detection module includes a first sensor mounted on the base and aligned with the locking unit, wherein when the tappet is in the front position, the locking unit releases the first sensor, and wherein when the tappet is in the rear position, the locking unit presses against the first sensor.

12. The lock assembly as claimed in claim 8, further comprising:

a detection module including a base fixed in the installation space of the frame and located below the unlocking member, wherein the first driver is coupled to the base, wherein the detection module includes a first sensor mounted on the base and aligned with the locking unit, and wherein the detection module further includes a second sensor aligned with the linking rod, wherein when the tappet is in the front position, the locking unit releases the first sensor, wherein when the tappet is in the rear position, the locking unit presses against the first sensor, wherein when the locking rod is in the retracted position, the linking rod releases the second sensor, and wherein when the locking rod is in the extended position, the linking rod presses against the second sensor.

* * * * *